United States Patent
Fletcher et al.

(10) Patent No.: US 11,445,094 B2
(45) Date of Patent: Sep. 13, 2022

(54) ELECTRONIC DEVICE HAVING A VISION SYSTEM ASSEMBLY HELD BY A SELF-ALIGNING BRACKET ASSEMBLY

(71) Applicant: Apple Inc., Cupertino, CA (US)

(72) Inventors: Ashley E. Fletcher, San Francisco, CA (US); David A. Pakula, San Francisco, CA (US); Daniel W. Jarvis, Sunnyvale, CA (US); Jared M. Kole, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 626 days.

(21) Appl. No.: 15/914,956

(22) Filed: Mar. 7, 2018

(65) Prior Publication Data
US 2019/0045094 A1    Feb. 7, 2019

Related U.S. Application Data

(60) Provisional application No. 62/542,280, filed on Aug. 7, 2017, provisional application No. 62/542,277, filed on Aug. 7, 2017.

(51) Int. Cl.
*G06K 9/28* (2006.01)
*H04N 5/225* (2006.01)
(Continued)

(52) U.S. Cl.
CPC ........... *H04N 5/2253* (2013.01); *G01B 11/25* (2013.01); *G01B 11/2513* (2013.01);
(Continued)

(58) Field of Classification Search
CPC .. H04N 5/2253; H04N 13/25; H04N 5/37213; H04N 5/2251; H04N 5/2252;
(Continued)

(56) References Cited

U.S. PATENT DOCUMENTS 8,180,112 B2    5/2012    Kurtz et al.
8,261,090 B1    9/2012    Matsuoka
(Continued)

FOREIGN PATENT DOCUMENTS

CN    101170646 A    4/2008
CN    102131357 A    7/2011
(Continued)

OTHER PUBLICATIONS

PCT Patent Application No. PCT/US2018/040648—International Search Report and Written Opinion dated Nov. 16, 2018.
(Continued)

*Primary Examiner* — Patrick E Demosky
(74) *Attorney, Agent, or Firm* — Dorsey & Whitney LLP

(57) ABSTRACT

An electronic device that includes a vision system carried by a bracket assembly is disclosed. The vision system may include a first camera module that captures an image of an object, a light emitting element that emits light rays toward the object, and a second camera module that receives light rays reflected from the object. The light rays may include infrared light rays. The bracket assembly is designed not only carry the aforementioned modules, but to also maintain a predetermined and fixed separation between the modules. The bracket assembly may form a rigid, multi-piece bracket assembly to prevent bending, thereby maintaining the predetermined separation. The electronic device may include a transparent cover designed to couple with a housing. The transparent cover includes an alignment module designed to engage a module and provide a moving force that aligns the bracket assembly and the modules to a desired location in the housing.

20 Claims, 21 Drawing Sheets

(51) Int. Cl.

| | |
|---|---|
| *G06F 3/03* | (2006.01) |
| *G06T 7/55* | (2017.01) |
| *H04N 5/372* | (2011.01) |
| *G01B 11/25* | (2006.01) |
| *H04N 13/25* | (2018.01) |
| *G06F 1/16* | (2006.01) |
| *G06F 1/20* | (2006.01) |
| *G06V 10/75* | (2022.01) |
| *G06V 20/64* | (2022.01) |
| *G06V 30/144* | (2022.01) |
| *G06V 40/16* | (2022.01) |

(52) U.S. Cl.
CPC ............ *G06F 1/1686* (2013.01); *G06F 1/203* (2013.01); *G06F 3/0325* (2013.01); *G06T 7/55* (2017.01); *G06V 10/757* (2022.01); *G06V 20/653* (2022.01); *G06V 30/144* (2022.01); *G06V 40/166* (2022.01); *H04N 5/37213* (2013.01); *H04N 13/25* (2018.05)

(58) Field of Classification Search
CPC ........ H04N 5/2257; G06T 7/55; G01B 11/25; G01B 11/2513; G06F 1/1686; G06F 1/203; G06F 3/0325; G06K 9/00214; G06K 9/00255; G06K 9/6211; G06K 9/28; H04M 1/0264
See application file for complete search history.

(56) References Cited

U.S. PATENT DOCUMENTS

| | | | |
|---|---|---|---|
| 8,788,977 B2 | 7/2014 | Bezos | |
| 9,019,428 B2 | 4/2015 | Shukla et al. | |
| 9,513,664 B2 | 12/2016 | Werner et al. | |
| 10,084,501 B1 | 9/2018 | Coverstone | |
| 10,165,161 B2 | 12/2018 | Wei et al. | |
| 10,268,234 B2 | 4/2019 | Fletcher et al. | |
| 10,771,714 B2 | 9/2020 | Alasirniö et al. | |
| 2005/0275748 A1 | 12/2005 | Takekuma et al. | |
| 2007/0009139 A1 | 1/2007 | Landschaft et al. | |
| 2008/0174692 A1 | 7/2008 | Kusaki et al. | |
| 2009/0041309 A1 | 2/2009 | Kim et al. | |
| 2011/0255000 A1* | 10/2011 | Weber .................. | B23K 26/351 348/374 |
| 2012/0081282 A1 | 4/2012 | Chin | |
| 2012/0176279 A1 | 7/2012 | Merz et al. | |
| 2012/0250950 A1 | 10/2012 | Papakipos et al. | |
| 2013/0033581 A1 | 2/2013 | Woo et al. | |
| 2013/0106787 A1 | 5/2013 | Lee | |
| 2013/0162894 A1 | 6/2013 | Lee | |
| 2013/0251215 A1 | 9/2013 | Coons | |
| 2014/0010425 A1 | 1/2014 | Gurman | |
| 2014/0063265 A1 | 3/2014 | Shukla et al. | |
| 2014/0084145 A1 | 3/2014 | Guan et al. | |
| 2014/0197922 A1 | 7/2014 | Stanwood et al. | |
| 2014/0240464 A1 | 8/2014 | Lee | |
| 2014/0294237 A1 | 10/2014 | Litvak et al. | |
| 2014/0313430 A1 | 10/2014 | Bui et al. | |
| 2015/0022620 A1 | 1/2015 | Siminoff | |
| 2015/0049191 A1 | 2/2015 | Scalisi et al. | |
| 2015/0077518 A1 | 3/2015 | Heine et al. | |
| 2015/0077624 A1* | 3/2015 | Havskjold ............. | G01J 1/4204 348/373 |
| 2015/0163382 A1 | 6/2015 | Kwong et al. | |
| 2015/0198864 A1 | 7/2015 | Havskjold et al. | |
| 2015/0311011 A1 | 10/2015 | Lynch et al. | |
| 2016/0028931 A1 | 1/2016 | Kwong et al. | |
| 2016/0061653 A1 | 3/2016 | Chang et al. | |
| 2016/0191769 A1 | 6/2016 | Yeh et al. | |
| 2016/0329628 A1 | 11/2016 | Kim et al. | |
| 2017/0026585 A1* | 1/2017 | Shaw ................... | H04N 5/2252 |
| 2017/0109511 A1 | 4/2017 | Dass | |
| 2017/0149944 A1* | 5/2017 | Louch ................. | H04M 1/6041 |
| 2017/0150124 A1 | 5/2017 | Thuries | |
| 2017/0188014 A1* | 6/2017 | Woo ..................... | G06F 1/1643 |
| 2017/0212571 A1 | 7/2017 | Yang et al. | |
| 2017/0230552 A1 | 8/2017 | Eromäki et al. | |
| 2017/0251137 A1 | 8/2017 | Evans et al. | |
| 2017/0286754 A1 | 10/2017 | Eder et al. | |
| 2018/0176426 A1 | 6/2018 | Wei et al. | |
| 2019/0041909 A1 | 2/2019 | Pakula et al. | |
| 2019/0045094 A1 | 2/2019 | Fletcher et al. | |
| 2019/0171251 A1 | 6/2019 | Fletcher et al. | |
| 2019/0295271 A1* | 9/2019 | Xu ..................... | G06K 9/00275 |
| 2020/0092447 A1 | 3/2020 | Fletcher et al. | |
| 2020/0379202 A9 | 12/2020 | Pakula et al. | |

FOREIGN PATENT DOCUMENTS

| | | |
|---|---|---|
| CN | 102592117 A | 7/2012 |
| CN | 102914941 A | 2/2013 |
| CN | 102187297 B | 3/2015 |
| CN | 104717409 A | 6/2015 |
| CN | 106603765 A | 4/2017 |
| CN | 107483674 A | 12/2017 |
| CN | 207200781 U | 4/2018 |
| CN | 208654686 U | 3/2019 |
| EP | 2555526 A2 | 2/2013 |
| EP | 2916527 B1 | 8/2016 |
| EP | 3171129 A1 | 5/2017 |
| EP | 3340585 A1 | 6/2018 |
| JP | H05344191 A | 12/1993 |
| JP | H10222249 A | 8/1998 |
| JP | 2004032271 A | 1/2004 |
| JP | 2004103866 A | 4/2004 |
| JP | 2004180223 A | 6/2004 |
| JP | 2006091177 A | 4/2006 |
| JP | 2007128995 A | 5/2007 |
| JP | 2010130101 A | 6/2010 |
| JP | 2012220942 A | 11/2012 |
| JP | 2014131088 A | 7/2014 |
| TW | I486744 B | 6/2015 |
| TW | 201540066 A | 10/2015 |
| TW | I567527 B | 1/2017 |
| WO | 2012020380 A1 | 2/2012 |
| WO | 2012106216 A2 | 8/2012 |
| WO | 2014088469 A1 | 6/2014 |
| WO | 2016043704 A1 | 3/2016 |
| WO | 2017003412 A1 | 1/2017 |
| WO | 2017112939 A1 | 6/2017 |
| WO | 2019032226 A1 | 2/2019 |

OTHER PUBLICATIONS

PCT Patent Application No. PCT/US2018/040758—International Search Report and Written Opinion dated Nov. 16, 2018.
European Patent Application 18186752.4—Partial European Search Report dated Dec. 13, 2018.
PCT Patent Application No. PCT/US2018/045657—International Search Report and Written Opinion dated Nov. 30, 2018.
Chris Smith. 'New iPhone 8 schematics leak offers several exciting revelations'. Retrieved from the Internet: <URL: https://bgr.com/2017/04/24/iphone-8-rumors-schematics-leaks></URL:> Apr. 24, 2017.

* cited by examiner

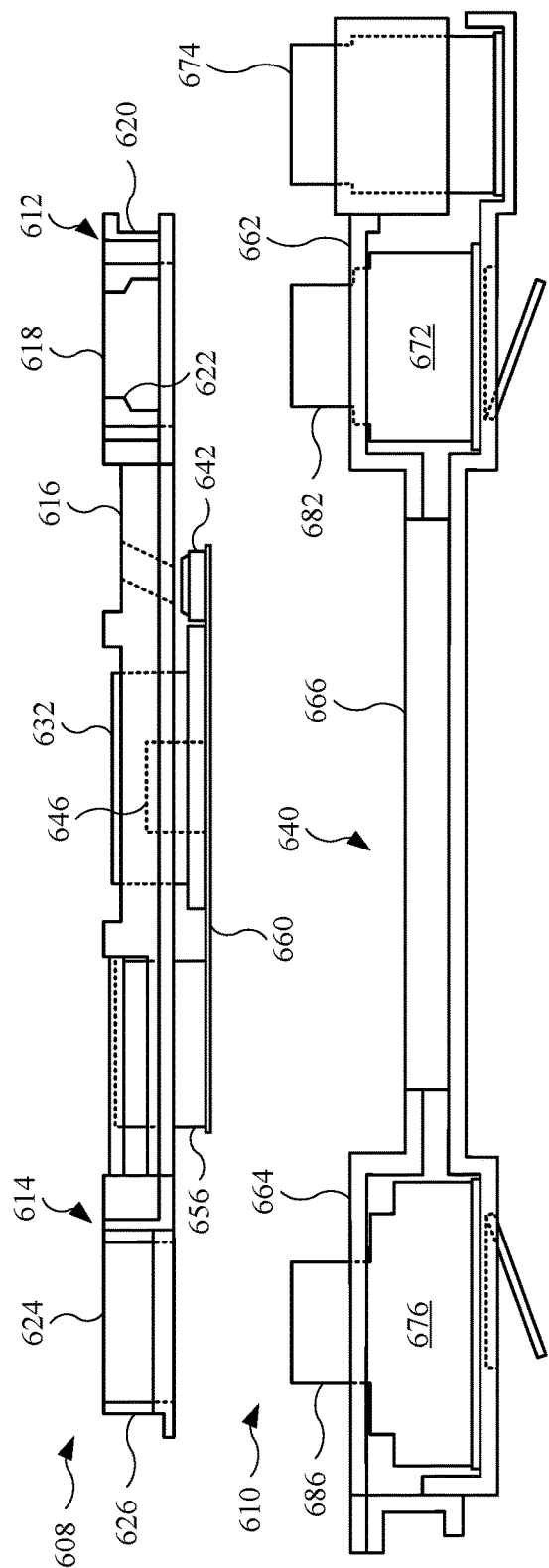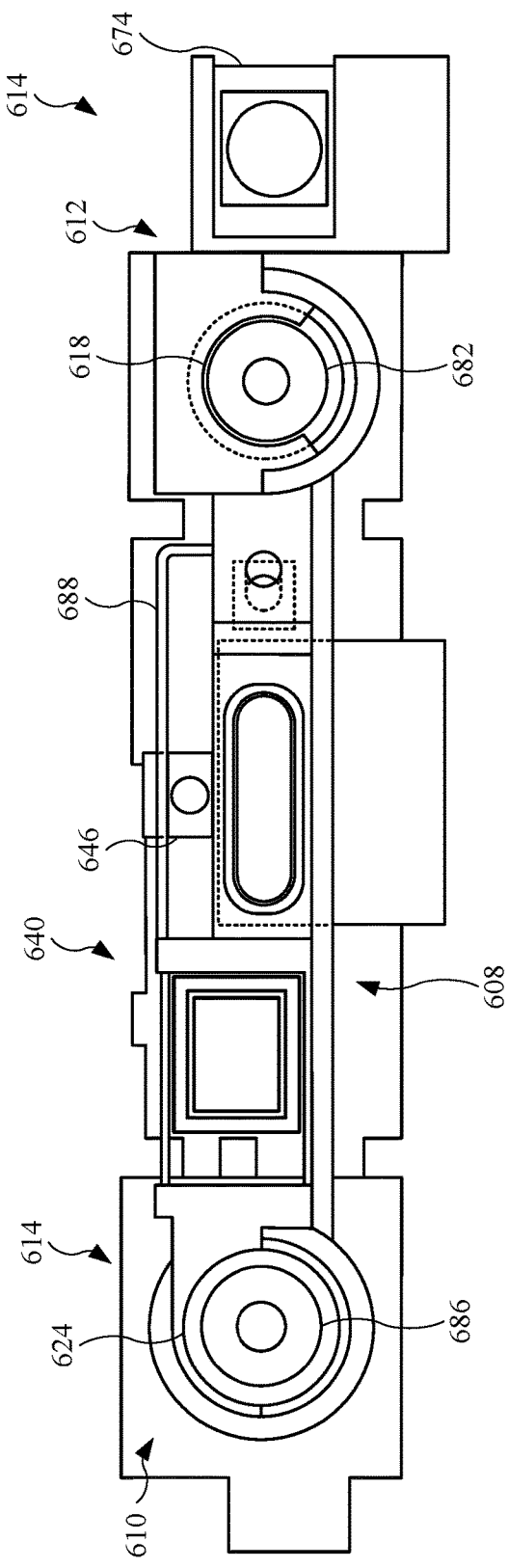

ELECTRONIC DEVICE HAVING A VISION SYSTEM ASSEMBLY HELD BY A SELF-ALIGNING BRACKET ASSEMBLY

CROSS-REFERENCE TO RELATED APPLICATION(S)

This application claims the benefit of priority to U.S. Provisional Application No. 62/542,280, filed on Aug. 7, 2017, titled "ELECTRONIC DEVICE HAVING A VISION SYSTEM ASSEMBLY HELD BY A SELF-ALIGNING BRACKET ASSEMBLY," and U.S. Provisional Application No. 62/542,277, filed on Aug. 7, 2017, titled "BRACKET ASSEMBLY FOR A MULTI-COMPONENT VISION SYSTEM IN AN ELECTRONIC DEVICE," the disclosures of which are incorporated herein by reference in their entirety.

FIELD

The following description relates to an electronic device. In particular, the following description relates to an electronic device that includes a bracket assembly designed to carry a vision system used to develop a depth map of an image captured by a camera module of the vision system, with the depth map representing a three-dimensional counterpart of the image. The bracket assembly maintains the modules of the vision system at a predetermined distance from each other. In order to properly align the vision system in the electronic device, the electronic device includes a transparent cover that includes an alignment module. During assembly between the transparent cover and an enclosure (or housing) of the electronic device, the alignment module is designed to engage at least one of the modules held by the bracket assembly to align the vision system in accordance with a desired location in the enclosure.

BACKGROUND

An emitter and receiver pair can be used to determine dimensional information. The emitter can radiate light onto an object. The light reflected from the object is directed toward, and collected by, the receiver. In some instances, the emitter-receiver pair is placed in an electronic device. As a result, the emitter-receiver pair may be subject to external forces exerted on the electronic device and transmitted to the emitter-receiver pair. In instances where the emitter-receiver pair is calibrated and subsequently relies upon a spatial relationship between the emitter and the receiver, any relative shifting, or movement, of one of the components (that is, the receiver or the emitter) causes the emitter-receiver pair to fall out of calibration, thereby causing the emitter-receiver pair to erroneously determine the dimensional information of the object. As a result, the electronic device may not function properly.

SUMMARY

In one aspect, an electronic device is described. The electronic device may include an enclosure that defines an internal volume. The enclosure may include sidewall components. The electronic device may further include a bracket assembly positioned in the internal volume. The bracket assembly may lack a direct attachment to the enclosure. The electronic device may further include a camera module carried by the bracket assembly. The electronic device may further include a transparent cover secured with the sidewall components and covering the bracket assembly. The transparent cover may include a masking layer. The masking layer may include a masking layer opening. The electronic device may further include an alignment module secured to the transparent cover. In some embodiments, the alignment module aligns the camera module with the masking layer opening.

In another aspect, an electronic device is described. The electronic may include an enclosure that includes a wall and sidewall components that combine with the wall to define an internal volume. The electronic may further include an enclosure that includes a wall and sidewall components that combine with the wall to define an internal volume. The electronic may further include a transparent cover secured with the enclosure, the transparent cover having an alignment module. The electronic may further include a bracket assembly positioned in the internal volume. The bracket assembly may carry a vision system aligned in the internal volume by the alignment module and configured for object recognition of an object that is external to the enclosure. In some embodiments, compression forces provided by the transparent cover and the enclosure to the bracket assembly maintain the bracket assembly fixed in the internal volume.

In another aspect, a method for assembling an electronic device that includes an enclosure that includes a wall and sidewall components that combine with the wall to define an internal volume is described. The method may include providing a bracket assembly in the internal volume. The bracket assembly may carry a camera module. The method may further include securing a transparent cover with the sidewall components of the enclosure. The transparent cover may include an alignment module. Also, the transparent cover may further include a masking layer that includes an opening. In some embodiments, securing the transparent cover with the enclosure aligns the camera module such that the camera module is aligned with the opening.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 11 illustrates a side view of an alignment module positioned over a bracket assembly and a vision system positioned in the bracket assembly, prior to an assembly operation;

FIG. 12 illustrates a side view of the alignment module, the vision system, and the bracket assembly shown in FIG. 11, further showing the alignment module and several modules and components in relation to the alignment module, in accordance with some described embodiments;

Figure 1:
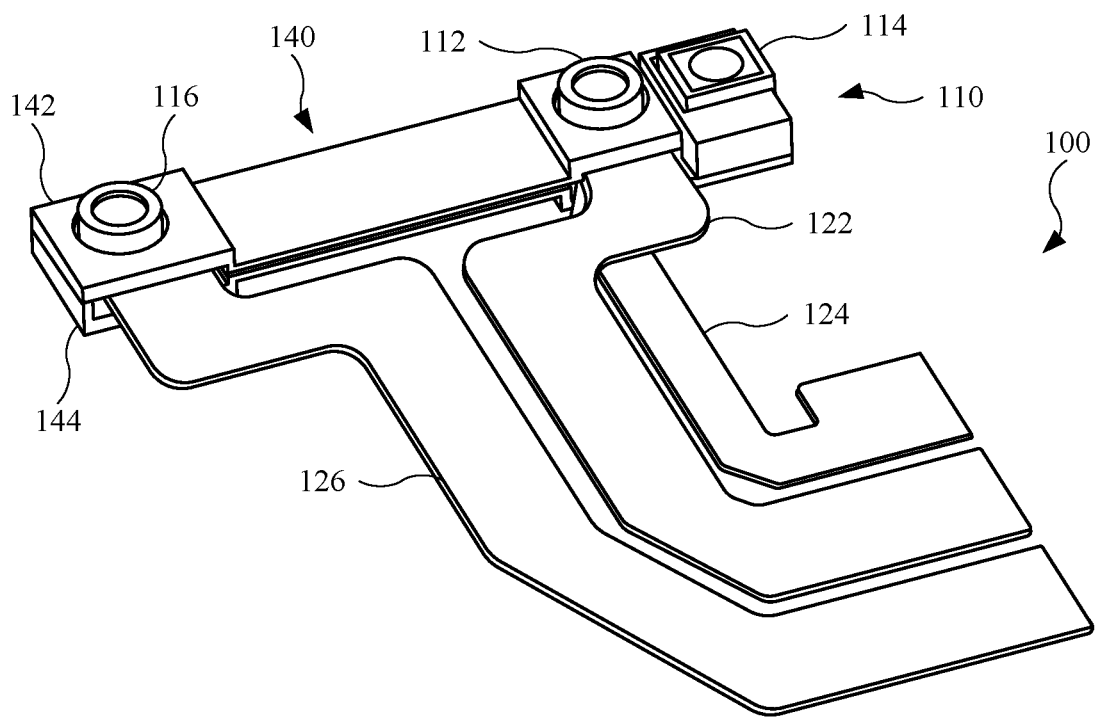
FIG. 1 illustrates a front isometric view of an embodiment of a system that includes a vision system and a bracket assembly designed to carry the vision system, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device that includes a vision system designed to assist in providing recognition of an object, or objects. In some instances, the vision system is designed to provide facial recognition of a face of a user of the electronic device. The vision system may include a camera module designed to capture an image, which may include a two-dimensional image. The vision system may further include a light emitting module designed to emit several light rays toward the object. The light rays may project a dot pattern onto the object. Further, the light emitting module may emit light in the frequency spectrum of invisible light, such as infrared light (or IR light). The vision system may further include an additional camera module designed to receive at least some of the light rays reflected from the object, and as a result, receive the dot pattern subsequent to the light rays being reflected by the object. The additional camera module may include a light filter designed to filter out light in that is not within the frequency spectrum of light emitted from the light emitting module. As an example, the light filter may include an IR light filter designed to block light that is outside the frequency range for IR light. The additional camera module may provide the dot pattern (or a two-dimensional image of the dot pattern) to a processor in the electronic device.

The light emitting module is designed to emit light rays such that when the object is flat (resembling a two-dimensional object), the projected dot pattern resembles a "uniform" dot pattern in which the dots are equally spaced apart in rows and columns. However, when the object includes a three-dimensional object (such as a face), the projected dot pattern may include a "non-uniform" dot pattern in which a separation distance between some adjacent dots differs from a separate distance of other adjacent dots. The variation in separation distances between adjacent dots corresponds some structural features of the object being closer to the light emitting module (and in particular, closer to the electronic device) as compared to other structural features. For example, adjacent dots projected onto relatively closer structural features of the object may be separated by a distance that is less than that of structural features of the object that are relatively further away. The relative separation distances of adjacent dots, along with a two-dimensional image of the object, may be used by the processor determine a third, additional dimension of the object such that a three-dimensional profile of the object is created. As a result, the vision system may assist in providing a three-dimensional representation of the object.

The vision system may be installed in the electronic device using a bracket assembly. The bracket assembly may include one or more bracket sub-assemblies, with a bracket sub-assembly including one or more bracket components. Once the camera modules and the light emitting module are installed in the bracket assembly, the bracket assembly is designed to maintain a fixed distance between the aforementioned modules. This includes instances when an external force is exerted on the electronic device (that carries the vision system and the bracket assembly), such as when the electronic device is dropped. When this occurs, the modules and the bracket assembly may shift relative to other components of the electronic device. However, the bracket assembly is designed to prevent or substantially limit relative movement of the modules with respect to each other. When modules are installed and relative movement of the modules is prevented or substantially limited, the modules may continue to accurately provide the aforementioned three-dimensional object recognition without re-calibration. Also, in order to provide stiffness and rigidity to prevent bending, the bracket assembly may include multiple bracket components welded and/or adhesively secured together, and may include multiple bends and inclined sections.

In order to facilitate the assembly process over traditional processes, the bracket assembly—subsequent to placement into an enclosure, or housing, of the electronic device—may not be mechanically fastened or affixed to the enclosure (although electrical connections may be established between the modules carried by the bracket assembly and a component(s) disposed in the enclosure). In order to align the bracket assembly in the enclosure in a desired manner, the electronic device may include an alignment module secured with a transparent cover (such as a cover glass). The alignment module may include multiple openings, each of which is designed to receive a module of the vision system. During an assembly operation while the transparent cover is assembled with the enclosure, the alignment module is designed to engage at least one of the modules. The engagement provides a force that adjusts or moves the bracket assembly, relative to the enclosure, to a desired location in the enclosure (or within an internal volume defined by the enclosure). The adjustment/movement may include movement in one or more dimensions (of a Cartesian coordinate system). Accordingly, the bracket assembly may be referred to as a "self-aligning bracket assembly" due to its ability to move about the enclosure and become aligned by the alignment module without any prefixing or pre-fastening of the bracket assembly.

In order to enhance the appearance, the electronic device may include masking layers designed to hide, or at least partially hide, the modules and the bracket assembly. As an example, the electronic device may include a transparent cover that includes various layers of ink. Some ink layers applied to the transparent cover include an opaque material that generally hides the modules and the bracket assembly, while other layers applied to the transparent cover include an appearance that matches (in terms of color) the appearance of the opaque material. However, these other layers may be designed to allow light, in the form of IR light or visible light, to pass. These light permissive layers may be located in openings of the opaque material. As a result, the camera module used to capture an image may be covered by an ink layer may that permits visible light to pass, while the light emitting module and the additional camera module may each be covered by an ink layer may that permits IR light to pass.

The alignment module can be adhered to the transparent cover in a manner that aligns openings of the alignment modules with some of the openings of the opaque material that are filled by light permissive layers. When the transparent cover is assembled with the enclosure, the modules are aligned with some of the openings of the alignment module. To limit or prevent movement of the bracket assembly, the bracket assembly may include flexible spring elements that support the bracket assembly. The spring elements are designed to flex or bend in response to compression forces from the transparent cover and the enclosure. In response, the spring elements may provide a counterforce that biases the bracket assembly (and the modules carried by the bracket assembly) in a direction toward the transparent cover, thereby increasing an engagement force between the bracket assembly and the alignment module. The increased engagement force may further maintain the bracket assembly in a fixed position and prevent unwanted movement of the bracket assembly (and the modules carried by the bracket assembly). Moreover, when the bracket assembly is formed from a metal, the bracket assembly may provide an electrical grounding path for the modules as the spring element may engage an electrical grounding material within the internal volume defined by the enclosure. For example, the enclosure may include a metal layer in contact with the spring elements. To further assist in electrical grounding, the modules may be adhered to the bracket assembly by an electrically conductive adhesive.

Traditional assembly processes may pre-fasten the bracket assembly and its components into a housing of the electronic device, followed by attaching the transparent cover to the housing. The traditional assembly processes may also include bracket assemblies and transparent covers sorted in bins, in which a bin may include bracket assemblies that fall into one of several predetermined ranges (of size), and another bin that may include transparent covers (with applied ink layers) that fall into one of several sizes that pair with a bracket assembly in with a given range. However, the electronic devices described herein include ink layers applied to the transparent cover without predetermining the specific bracket assembly and modules to be used with the electronic device, as the modules carried by the can be properly aligned with their respective ink layers with the assistance of the alignment module.

These and other embodiments are discussed below with reference to FIGS. 1-31. However, those skilled in the art will readily appreciate that the detailed description given herein with respect to these Figures is for explanatory purposes only and should not be construed as limiting.

FIG. 1 illustrates a front isometric view of an embodiment of a system 100 that includes a vision system 110, or vision subsystem, and a bracket assembly 140 designed to carry the vision system 110, in accordance with some described embodiments. As shown, the vision system 110 may include several operational components (including optical components), with each operational component providing a specific function. For example, the vision system 110 may include a first camera module 112, a light emitting module 114, and a second camera module 116. The first camera module 112, or first operational component, is designed to capture an image of an object (not shown). The light emitting module 114, or second operational component, is designed to emit light, in the form of multiple light rays, in a direction toward the object. Accordingly, the light emitting module 114 may be referred to as a light emitter. In some instances, the light emitting module 114 emits light that is not visible by the human eye. For example, the light emitting module 114 may emit IR light. The second camera module 116, or third operational component, is designed to receive at least some of the light rays that are emitted from the light emitting module 114, subsequent to the light rays reflecting from the object. Accordingly, the second camera module 116 may be referred to as a light receiver. Also, the second camera module 116 may include a filter designed to filter out other types of light outside the frequency range of the light rays emitted from the light emitting module 114. As an example, the filter (located within the second camera module 116 or over a lens of the second camera module 116) may permit only IR light emitted from the light emitting module 114 to enter the second camera module 116.

The vision system 110 is designed to assist in object recognition. In this regard, the vision system 110 may use the first camera module 112 to generate a two-dimensional image of the object. In order to determine spatial relationships between various features of the object, the light rays emitted from the light emitting module 114 may project a dot pattern onto the object (or objects). When the light generated from the light emitting module 114 is reflected from the object, the second camera module 116 captures the reflected light to create an image of the projected dot pattern on the object. The projected dot pattern can be used to form a depth map of the object, with the depth map corresponding to a three-dimensional counterpart of the object. The combination of the image (taken by the first camera module 112) and the dot pattern (taken by the second camera module 116) projected onto the image can be used to develop a three-dimensional profile of the object. In this regard, when the vision system 110 is in an electronic device (not shown), the vision system 110 can assist the electronic device in providing a facial recognition of a face of a user of the electronic device. This will be further discussed below.

The bracket assembly 140 may include a first bracket 142 coupled to a second bracket 144. The coupling may include welding, adhering, fastening, clipping, or the like. The first bracket 142 and the second bracket 144 may include a rigid material, such as steel or aluminum. However, other materials, such as plastic (including a molded plastic), are possible. In order for the vision system 110 to provide accurate object recognition, the space or distance between the modules should remain constant, or at least substantially constant. In other words, any relative movement of a module of the vision system 110 with respect to the remaining modules should be prevented or substantially limited. The bracket assembly 140 is designed to provide a rigid system that houses the modules and also prevents relative movement of any module with respect to the remaining modules. Further, when the vision system 110 and the bracket assembly 140 are positioned in an electronic device, external forces exerted on the electronic device (such as a drop of the electronic device against a structure) may cause the vision system 110 and the bracket assembly 140 to move or shift in the electronic device. However, any movement of bracket assembly 140 may correspond to an equal amount of movement of each of the modules of the vision system 110 such that relative movement of the modules of the vision system 110 is prevented. Moreover, in some instances, the bracket assembly 140 is not held or affixed to an enclosure of the electronic device by fasteners, adhesives, clips, or other rigid fixture-type structures. This will be further discussed below.

Each of the modules of the vision system 110 may include a flexible circuit, or flex connector, designed to electrically couple a module to a circuit board (not shown) to place the vision system 110 in electrical communication with one or more processor circuits (not shown) positioned on the circuit board. For example, the first camera module 112, the light emitting module 114, and the second camera module 116 may include a first flexible circuit 122, a second flexible circuit 124, and a third flexible circuit 126, respectively, with each of the flexible circuits, or flex connectors, extending from their respective modules and out of bracket assembly 140. Also, as shown, the first flexible circuit 122 may overlap the second flexible circuit 124 in order to align the flexible circuits in a desired manner.

Figure 2:
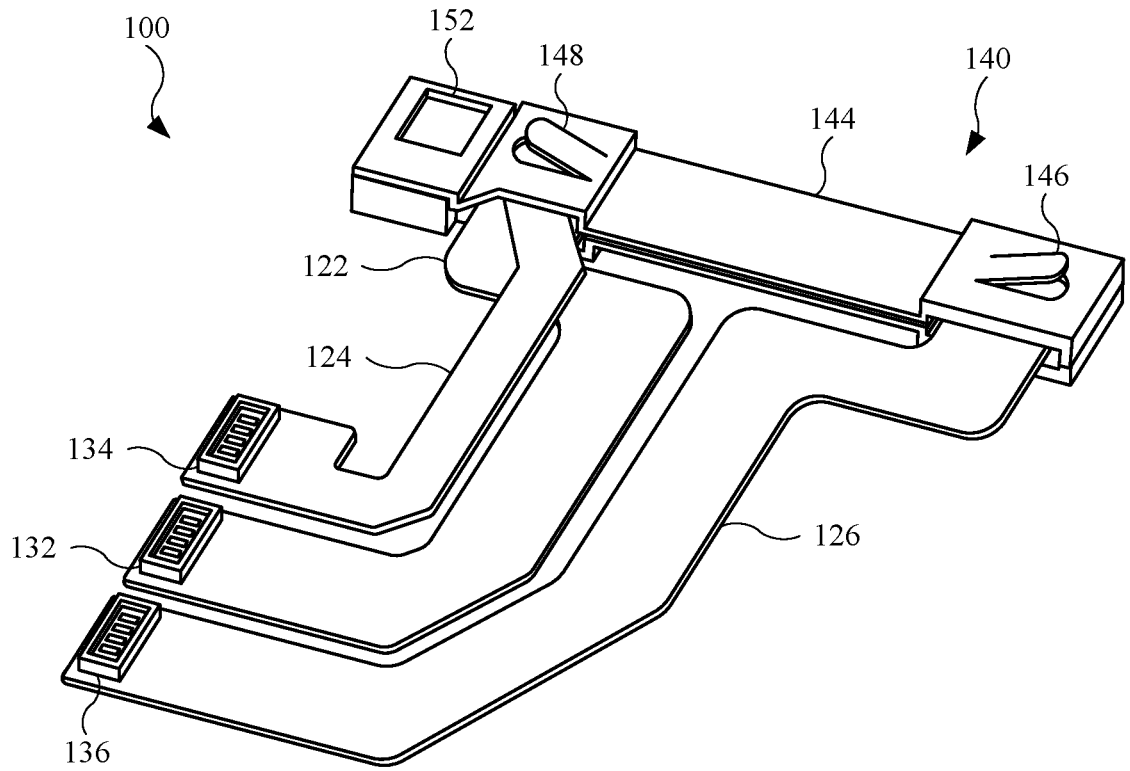
FIG. 2 illustrates a rear isometric view of the system shown in FIG. 1, showing additional features of the bracket assembly.

FIG. 2 illustrates a rear isometric view of the system 100 shown in FIG. 1, showing additional features of the bracket assembly 140. As shown, the second bracket 144 may include spring elements, such as a first spring element 146 and a second spring element 148, that extend from a surface of the second bracket 144. When the bracket assembly 140 is positioned in an electronic device (not shown), the spring elements may engage an enclosure (or some other structural feature in the enclosure) of the electronic device and support the bracket assembly 140 and the modules. Further, the spring elements may act as biasing elements that bias the bracket assembly 140 in a direction away from the enclosure. For instance, when a transparent cover (such as a cover glass) is secured with the enclosure, the transparent cover and/or the enclosure may apply compression forces on the bracket assembly 140, causing bending or flexing of the first spring element 146 and the second spring element 148. However, the first spring element 146 and the second spring element 148 are designed to provide a counterforce that biases the bracket assembly 140 toward the transparent cover and against an alignment module (discuss later), thereby providing a securing force for the bracket assembly 140 (and the vision system 110). This will be further shown below. Also, in some instances, a cutting operation used to cut the second bracket 144 to form the first spring element 146 and the second spring element 148 may cut only a portion of the second bracket 144 such that the second bracket 144 does not include through holes, or openings, in locations corresponding to the first spring element 146 and the second spring element 148. As a result, the second bracket 144 maintains a continuous, uninterrupted support layer for the modules in location corresponding to the first spring element 146 and the second spring element 148.

In order to electrically couple the modules to a circuit board, the flexible circuits may include connectors. For example, the first flexible circuit 122, the second flexible circuit 124, and the third flexible circuit 126 may include a first connector 132, a second connector 134, and a third connector 136, respectively. Also, the second bracket 144 may include a through hole 152, or opening, in a location corresponding to the light emitting module 114 (shown in FIG. 1). This allows for a heat sinking element (not shown) to pass through the through hole 152 and thermally couple to the light emitting module 114 in order to dissipate heat from the light emitting module 114 and prevent overheating during use.

FIGS. 1 and 2 show a system 100 that is fully assembled with the vision system 110 carried by the bracket assembly 140. In other words, the first bracket 142 and the second bracket 144 can combine to receive and secure the first camera module 112, the light emitting module 114, and the second camera module 116. In this regard, the aforementioned modules may enhance or increase the overall rigidity of the system 100. For example, the modules may occupy spaces or voids between the first bracket 142 and the second bracket 144, while also engaging the first bracket 142 and/or the second bracket 144. Accordingly, the modules may prevent the bracket assembly 140 from unwanted twisting or bending.

Figure 3:
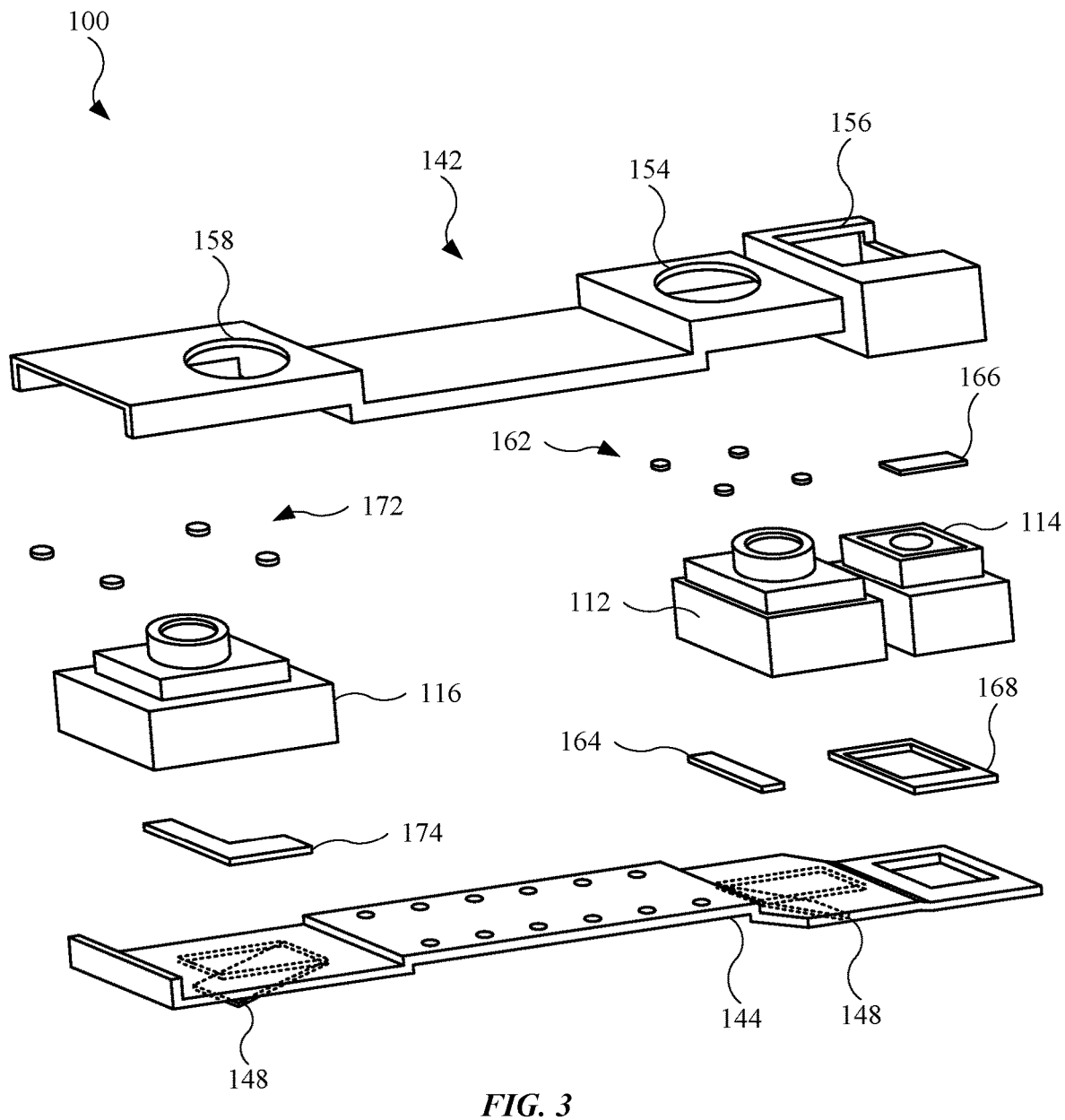
FIG. 3 illustrates an exploded view of the system shown in FIGS. 1 and 2, showing the bracket assembly, the modules and additional features.

FIG. 3 illustrates an exploded view of the system 100 shown in FIGS. 1 and 2, showing the bracket assembly 140, the modules, and additional features. For purposes of simplicity, the flexible circuits are removed from the modules. Although the first bracket 142 is designed to combine with the second bracket 144 to hold and maintain the modules in a fixed position, the first bracket 142 may include through holes to accommodate the modules. For example, the first bracket 142 may include a through hole 154 designed to receive a barrel of the first camera module 112. The first bracket 142 may further include a through hole 156 designed to receive a raised portion of the light emitting module 114. The first bracket 142 may include a through hole 158 designed to receive a barrel of the second camera module 116. Accordingly, the aforementioned barrels and raised portions may protrude through the first bracket 142 via the respective through holes.

The first bracket 142 and the second bracket 144 may be secured together by, for example, a welding operation. For example, the first bracket 142 may include a recessed region that defines a flat or planar portion that is welded to a corresponding recessed region of the second bracket 144. As shown, the recessed region of the second bracket 144 includes several circular weld spots (not labeled). In addition to welding the bracket elements together, adhesives may be used to further secure the modules. For example, the first camera module 112 may secure with the first bracket 142 and the second bracket 144 by adhesive elements 162 and an adhesive 164, respectively. Also, the light emitting module 114 may secure with the first bracket 142 and the second bracket 144 by an adhesive element 166 and an adhesive element 168, respectively. Also, the second camera module 116 may secure with the first bracket 142 and the second bracket 144 by adhesive elements 172 and an adhesive element 174, respectively. In some embodiments, at least some of the aforementioned adhesives include an electrically conductive adhesive. In this manner, the modules may be electrically coupled with the first bracket 142 and/or the second bracket 144. Further, when the first bracket 142 is secured with the second bracket 144, the modules may be electrically grounded to an electronic device (not shown) by way of the first spring element 146 and/or the second spring element 148. This will be shown below. Furthermore, the aforementioned bracket elements (including the spring elements), being formed from a metal, may also provide a thermally conductive pathway that allows heat dissipation of at least one of the modules of the vision system 110 by way of at least one of the bracket elements.

Figure 4:
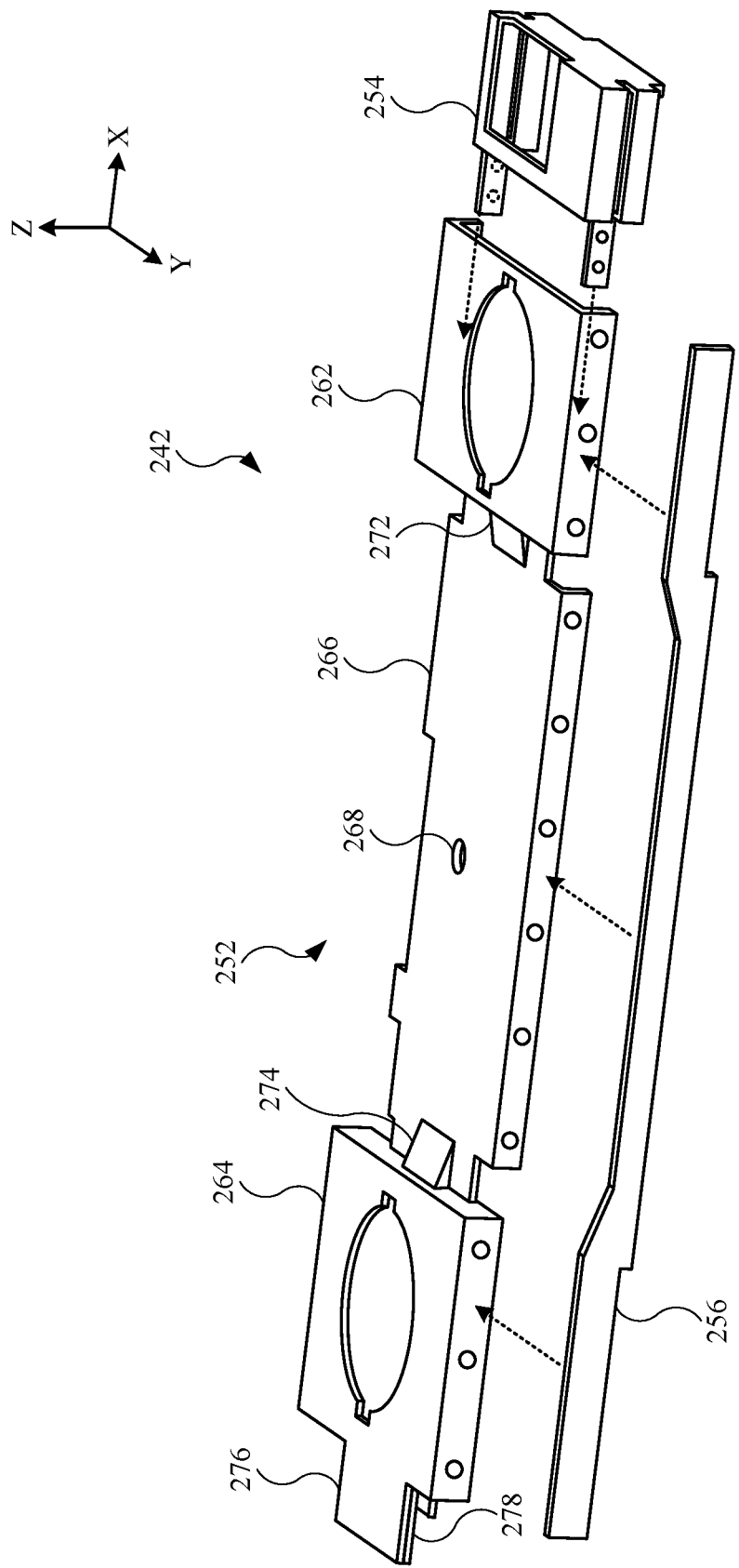
FIG. 4 illustrates an exploded view of an alternate embodiment of a first bracket, showing the first bracket formed from several structural components, in accordance with some described embodiments.

Due in part to bracket assemblies described herein being used as rigid components designed to maintain the modules in a fixed position, at least some part of a bracket assembly may be reinforced to enhance the overall strength. For example, FIG. 4 illustrates an exploded view of an alternate embodiment of a bracket 242, showing the bracket 242 formed from several structural components, in accordance with some described embodiments. The bracket 242 may substitute for the first bracket 142 (previously shown) and may be used with bracket assemblies described herein. As shown, the bracket 242 includes a multi-piece assembly that includes a first bracket part 252, a second bracket part 254, and a third bracket part 256. In this regard, the bracket 242 may be referred to as a bracket sub-assembly.

The first bracket part 252 may include a first section 262 designed to receive a module, such as the first camera module 112 (shown in FIG. 3). The first bracket part 252 may further include a second section 264 designed to receive a module, such as the second camera module 116 (shown in FIG. 3). The first bracket part 252 may further include third section 266, or recessed section, that is recessed with respect to the first section 262 and the second section 264. The third section 266 may be recessed in order to receive an additional component or components. This will be further shown below. Also, the third section 266 may include a through hole 268, or opening, that assists in aligning one of the aforementioned components.

In order to form the first bracket part 252, the first bracket part 252 may undergo a cutting and stamping operation. The stamping operation may shape the first bracket part 252 and provide the first bracket part 252 with additional structural rigidity. For example, the stamping operation may form a first inclined section 272 between the first section 262 and the third section 266. The first inclined section 272 may prevent the first section 262 from bending or pivoting (along the Y-axis) with respect to the third section 266 along an intersection that joins the first section 262 and the third section 266. Also, the stamping operation may form a second inclined section 274 between the second section 264 and the third section 266. The second inclined section 274 may prevent the second section 264 from bending or pivoting (along the Y-axis) with respect to the third section 266 along an intersection that joins the second section 264 and the third section 266. In this manner, when the first section 262 and the second section 264 are prevented from rotational movement with respect to the third section 266, the modules (such as the first camera module 112 and the second camera module 116 shown in FIG. 3) are prevented from relative movement with respect to each other, thereby maintaining the vision system 110 (shown in FIG. 1) is unaltered state.

The second bracket part 254 may be secured (by welding, soldering, and/or other adhering methods) to an internal region of the first bracket part 252. The second bracket part 254 may be designed to carry a module, such as the light emitting module 114 (shown in FIG. 1). In this regard, the second bracket part 254 may be referred to as a module carrier. By initially forming the second bracket part 254 separate from the first bracket part 252, and then securing the second bracket part 254 with the first bracket part 252, a joint (or joints) formed between the first bracket part 252 and the second bracket part 254 provides additional stability and rigidity. The joint(s) may further fix the second bracket part 254 with respect to the first bracket part 252, and accordingly, may fix a module and prevent the module carried by the second bracket part 254 from relative movement with respect to other modules. Also, the third bracket part 256 may act as a support member or supporting element that extends substantially across a dimension (such as a length along the X-axis) of the first bracket part 252. The third bracket part 256 may be secured with the first bracket part 252 through any manner previously described for securing the second bracket part 254 with the first bracket part 252. Several circular weld spots (not labeled) are shown along the first section 262, the second section 264, and the third section 266 of the first bracket part 252. The third bracket part 256 may prevent both the first section 262 and the second section 264 from bending or pivoting (along the Y-axis) with respect to the third section 266. As a result, the third bracket part 256 may prevent a module (or modules) from relative movement with respect to other modules of a vision system (such as the vision system 110 shown in FIG. 1). Also, as shown in FIG. 4, the second section 264 may include an extension 276 and a clamp 278 secured with the extension 276. The clamp 278 may be used to secure a second bracket (not shown) with the bracket 242.

Figure 5:
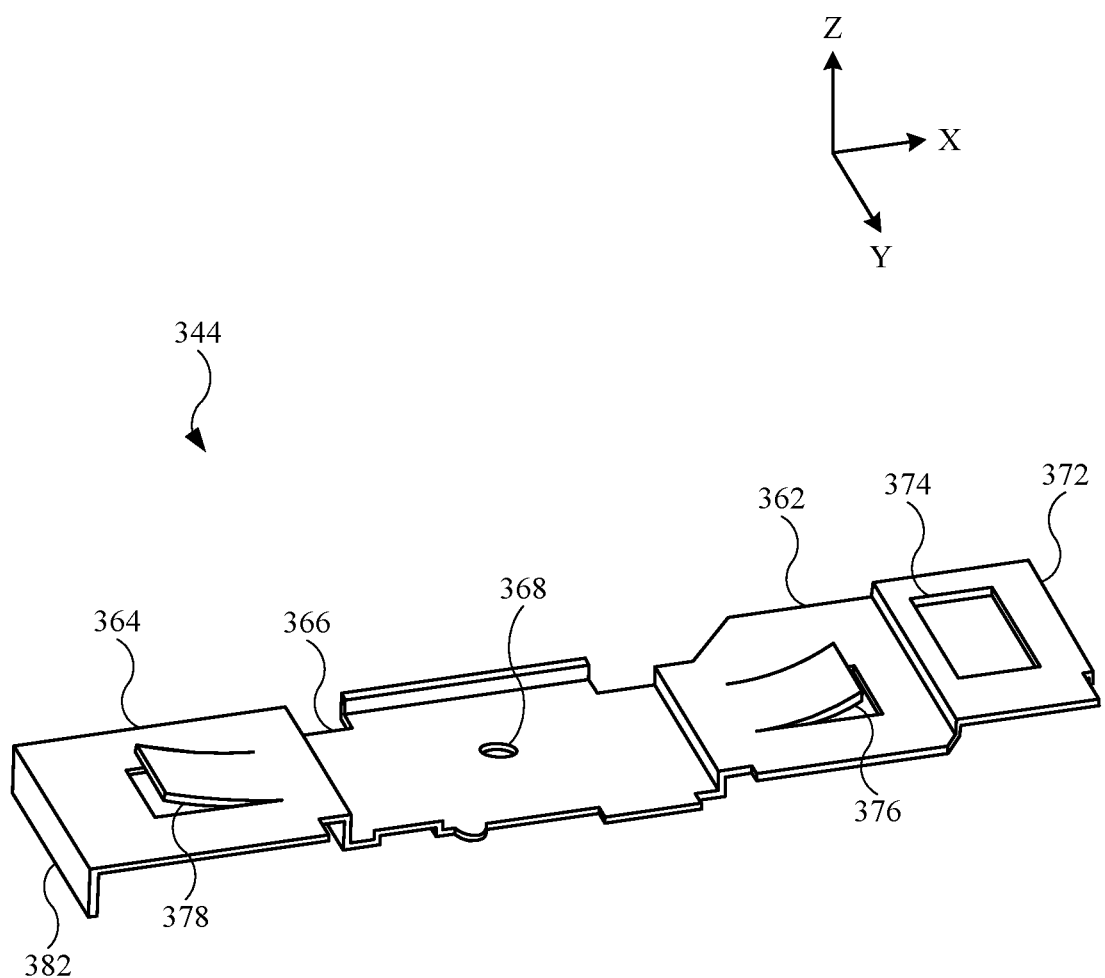
FIG. 5 illustrates a rear view of an alternate embodiment of a second bracket, in accordance with some described embodiments.

FIG. 5 illustrates a rear view of an alternate embodiment of a bracket 344, in accordance with some described embodiments. The bracket 344 may substitute for the second bracket 144 (previously shown) and may be used with bracket assemblies described herein. Also, the bracket 344 can be used in conjunction with the first bracket 142 (shown in FIG. 1) or the bracket 242 (shown in FIG. 4). Regarding the bracket 242 in FIG. 4, the bracket 344 may include a first section 362 and a second section 364 designed to pair with the first section 262 and the second section 264, respectively, of the bracket 242 (shown in FIG. 4). It should be noted that the bracket 344 should be rotated 180 degrees around the Y-axis prior to combining with the bracket 242 (shown in FIG. 4). The bracket 344 may further include a third section 366, or recessed section, that is recessed with respect to the first section 362 and the second section 364. The third section 366 may be recessed in order to engage the third section 266 (shown in FIG. 4). In this regard, the bracket 242 (shown in FIG. 4) may be secured with the bracket 344 at their respective third sections by, for example, welding, fastening, clipping, adhering, or the like. Also, the third section 366 may include a through hole 368, or opening, that assists in aligning one of the aforementioned components. The bracket 344 may further include a fourth section 372 designed to receive a module, such as a light emitting module 114 (shown in FIG. 3). In order to draw heat from a light emitting module, the fourth section 372 may include a through hole 374, or opening, designed to receive a heat sinking element (not shown) that thermally couples to the light emitting module.

The bracket 344 may further include a first spring element 376 and a second spring element 378, each of which is designed to flex against a structure (such as a housing or enclosure) and provide a biasing force away from the structure. Also, the second section 364 may include a support column 382 designed to pair with the clamp 278 (shown in FIG. 4), thereby further securing the bracket 344 with the bracket 242 (shown in FIG. 4) to further secure the modules.

Figure 6:
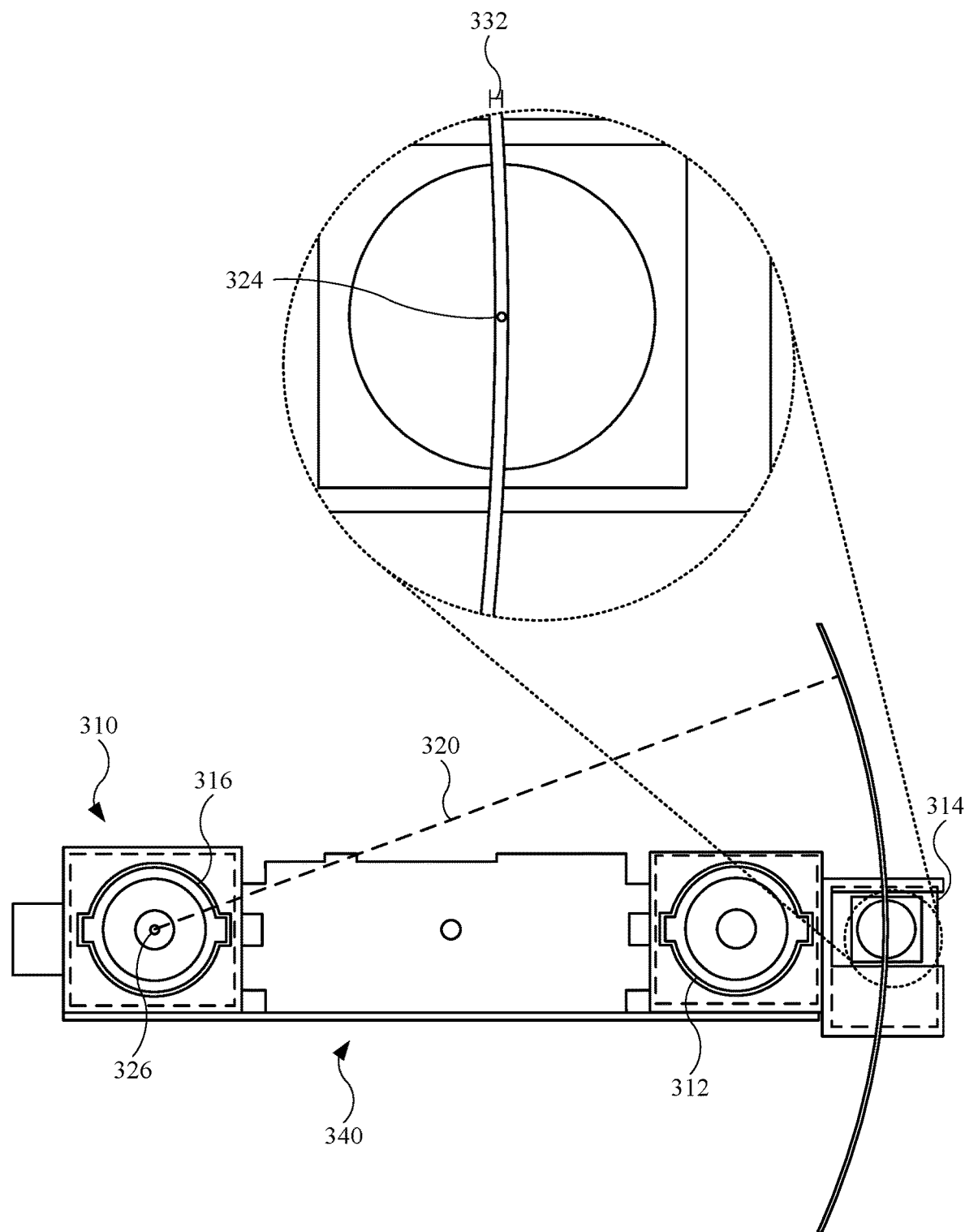
FIG. 6 illustrates a plan view of an embodiment of a vision system positioned in a bracket assembly, showing the bracket assembly maintaining spatial relationships between the modules, in accordance with some described embodiments.

FIG. 6 illustrates a plan view of an embodiment of a vision system 310 positioned in a bracket assembly 340, showing the bracket assembly 340 maintaining spatial relationships between the modules, in accordance with some described embodiments. The vision system 310 and the bracket assembly 340 may include any features described herein for a vision system and a bracket assembly, respectively. As shown, the vision system 310 may include a first camera module 312, a light emitting module 314, and a second camera module 316. When positioned in the bracket assembly 340, the light emitting module 314 is separated by from the second camera module 316 by a distance 320. In particular, the distance 320 represents a distance between a center point 324 of the light emitting module 314 (shown in the enlarged view) and a center point 326 of the second camera module 316. The bracket assembly 340 is designed to maintain the center point 324 with in a range 332, or tolerance, to ensure that the center point 324 of the light emitting module 314 is within an acceptable range or tolerance of the distance 320 from the center point 326 of the second camera module 316. In some embodiments, the range 332 is less than 1 millimeter. In some embodiments, the range 332 is approximately 120 to 200 micrometers. In a particular embodiment, the range 332 is 160 micrometers, or at least approximately 160 micrometers. It should be noted that the bracket assembly 340 is designed to maintain the first camera module 312 at a predetermined distance from the second camera module 316. By maintaining these distances, the bracket assembly 340 ensures the vision system 310 can accurately and reliably provide information related to object recognition. Further, when the bracket assembly 340 and the vision system 310 are positioned in an electronic device (not shown), any external load or force to the electronic device that causes movement of the bracket assembly 340 may also cause the same amount of movement to each module of the vision system 310 so that there is little or no relative movement among the modules with respect to other modules.

Figure 7:
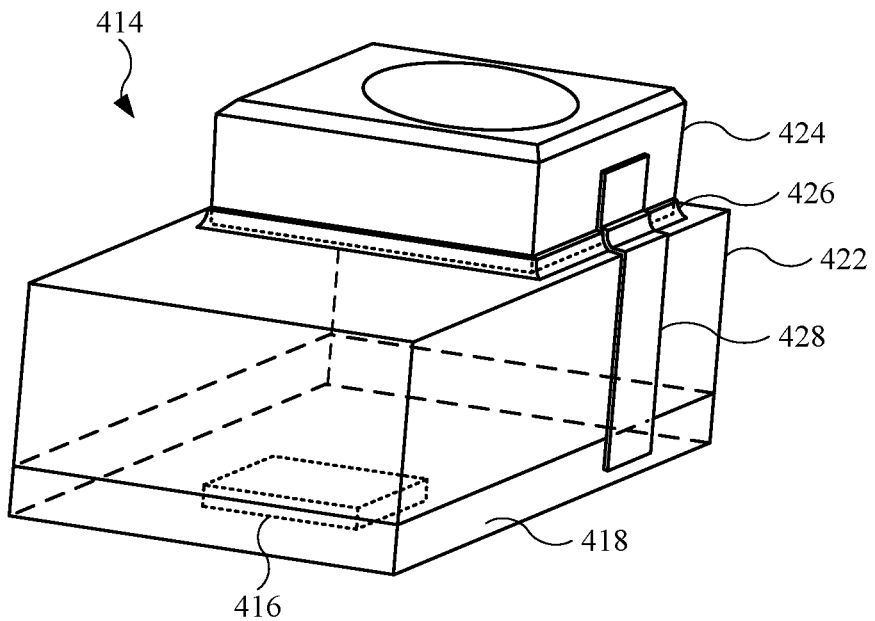
FIG. 7 illustrates an isometric view of an embodiment of a light emitting module, in accordance with some described embodiments.

FIG. 7 illustrates an isometric view of an embodiment of a light emitting module 414, in accordance with some described embodiments. As shown, the light emitting module 414 may include a light emitter 416 held by a substrate 418. In some embodiments, the light emitter 416 emits light in the non-visible spectrum, such as IR light. Further, the light emitter 416 can be designed to emit IR laser light. However, in some embodiments (not shown in FIG. 7), the light emitter 416 produces light other than IR light. The light emitting module 414 may further include an optical structure 422 positioned over the light emitter 416. The optical structure 422 may include a transparent material (such as glass) folded into multiple portions. The optical structure 422 is designed to reflect or bend a light emitted from the light emitter 416 within the optical structure 422 in order to provide an increased optical path for the light. This will be shown below.

The light emitting module 414 may further an optical element 424 positioned over the optical structure 422 in a manner such that light received by, and reflected from, the optical structure 422 passes through the optical element 424. The optical element 424 may secure with the optical structure 422 by an adhesive 426. In some embodiments, the optical element 424 is a diffractive optical element. In this manner, the light received from the optical structure 422, which may include a one-dimensional light beam, may be split into a two-dimensional array or pattern of light to create a dot pattern of light. The array of light may then exit the optical element 424. This will be shown below.

Also, in some instances, the light emitted by the light emitter 416 may include a relatively high intensity. However, after exiting the optical element 424 as a dot pattern, the intensity may be sufficiently reduced, and as a result, the light from the light emitting module 414 is safe for human use. In order to account for instances in which the optical element 424 is removed from the optical structure 422, the light emitting module 414 may further include a flexible circuit 428 secured with the optical element 424. The flexible circuit 428 may also secure with the substrate 418 and may electrically couple to the light emitter 416. The flexible circuit 428 may use the optical element 424 as a "plate" and form a parallel-plate capacitor with the optical element 424 by supplying an electrical charge to a plate (not shown) of the flexible circuit 428. In this manner, when the optical element 424 is removed from the optical structure 422 (or is otherwise no longer positioned over the light exiting the optical structure 422), the flexible circuit 428 detects a change in capacitance, and provides an input used to power down the light emitter 416 and prevent the light emitter 416 from emitting light. Accordingly, the flexible circuit 428 acts as a safety mechanism to prevent high intensity light from exiting the optical structure 422 without also passing through the optical element 424.

Figure 8:
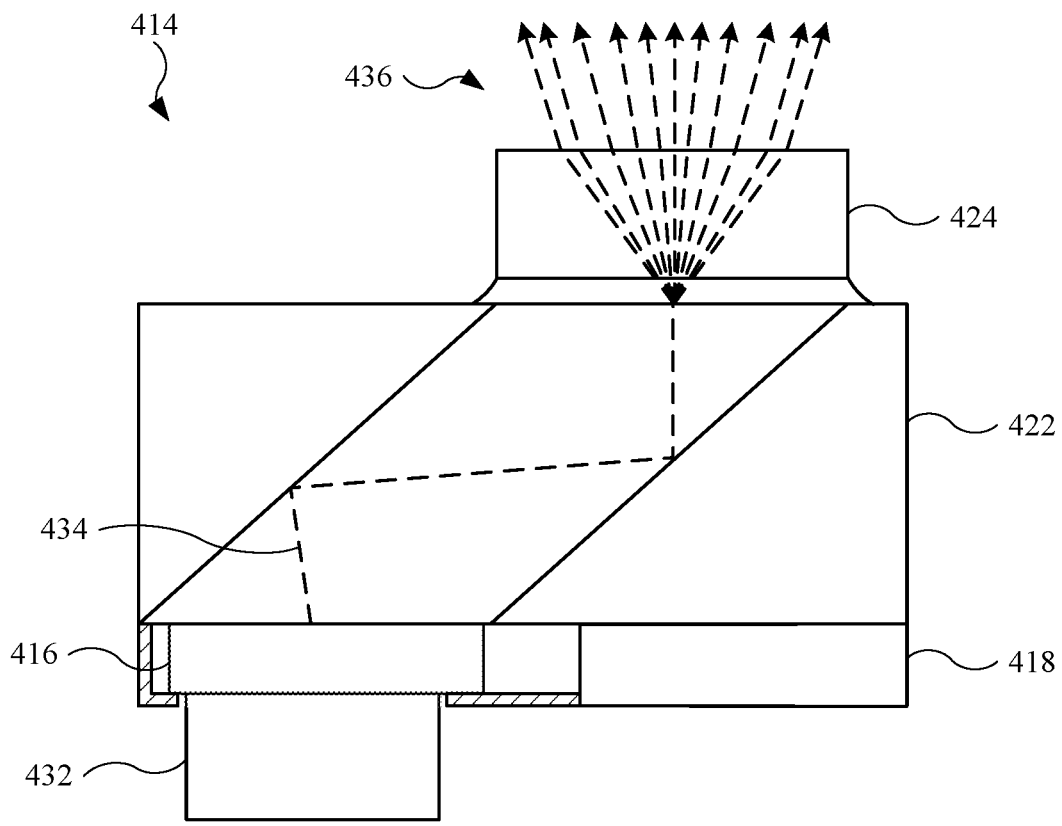
FIG. 8 illustrates a side view of the light emitting module shown in FIG. 7, further showing additional features of the light emitting module.

FIG. 8 illustrates a side view of the light emitting module 414 shown in FIG. 7, further showing additional features of the light emitting module 414. For purposes of illustration, the flexible circuit 428 is removed. Also, a partial cross sectional view of the substrate 418 is shown in order to view the light emitter 416 and a heat sinking element 432 thermally coupled to the light emitter 416. The heat sinking element 432 is designed to draw heat away from the light emitter 416 during use. As shown, the light emitter 416 generates a light beam (shown as a dotted line 434) that passes through the optical structure 422. The optical structure 422 causes the light beam to reflect several times (within the optical structure 422) such that the optical path increases do a desired optical "length." The light beam exits the optical structure 422 and enters the optical element 424, where the light beam is split into multiple light rays (represented by multiple dotted lines 436). The optical element 424 is designed to project a desired dot pattern. In some embodiments, the projected dot pattern includes an array of dots, with adjacent dots equidistantly spaced apart from one another. This will be shown below.

Figure 9:
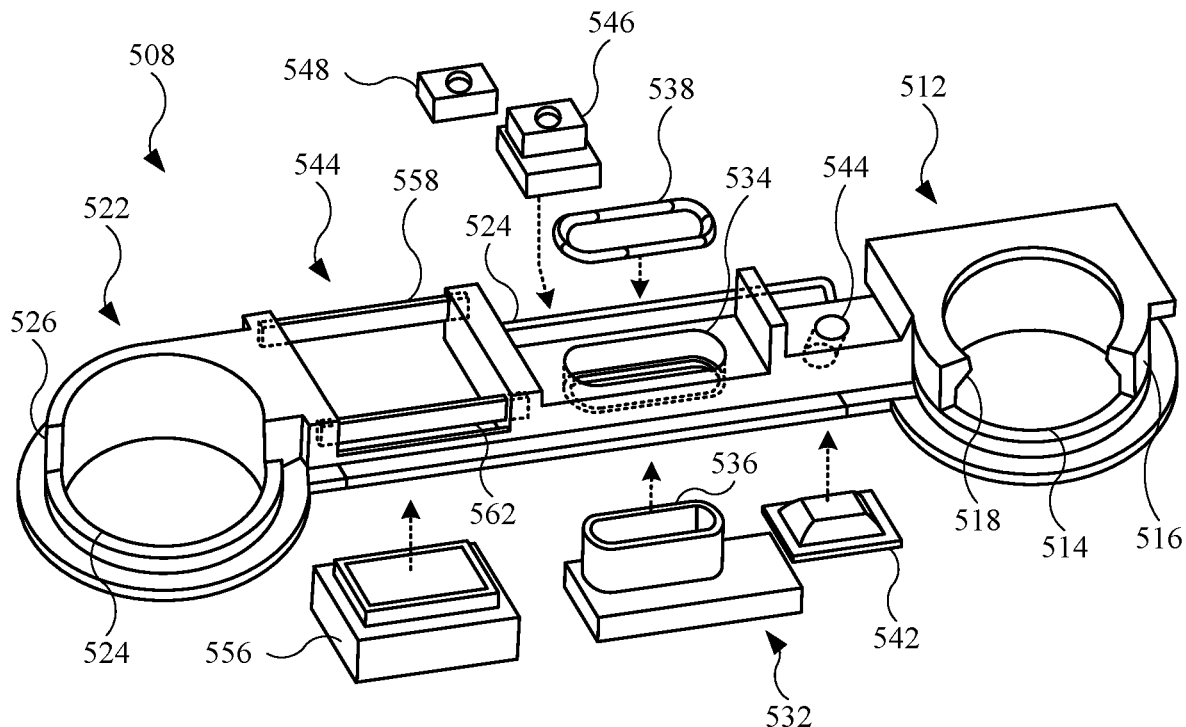
FIG. 9 illustrates an isometric view of an embodiment of an alignment module, in accordance with some described embodiments.

When a bracket assembly and a vision system carried by the bracket assembly are placed in an electronic device, the bracket assembly may not be directly secured to a structural component (such as a housing or enclosure) of the electronic device. However, the electronic device is designed to align the bracket assembly, and accordingly, the vision system, in a precise manner. FIG. 9 illustrates an isometric view of an embodiment of an alignment module 508, in accordance with some described embodiments. The alignment module 508 can be fastened (by adhesives, as an example) to a transparent cover of an electronic device, with the transparent cover providing a protective cover to a display assembly for the electronic device. In this manner, while the transparent cover is lowered onto the enclosure, the alignment module 508 is designed to engage the vision system, causing both the vision system and the bracket assembly to move or shift (relative to the enclosure) to a desired location in the electronic device. This will be shown and described below.

As shown, the alignment module 508 may include a first section 512 that includes an opening 514 that defines a through hole. The opening 514 is designed to receive at least a portion of a module of a vision system, such as the first camera module 112 (shown in FIG. 1). In particular, the opening 514 may include a size and shape to receive a barrel of the module. The alignment module 508 may further include a second section 522 that includes an opening 524 that defines a through hole. The opening 524 is designed to receive at least a portion of a module of a vision system, such as the second camera module 116 (shown in FIG. 1). In particular, the opening 524 may include a size and shape to receive a barrel of the module. The opening 514 and the opening 524 in the first section 512 and the second section 522, respectively, may provide alignment structures for the alignment module 508.

While the aforementioned openings of the alignment module 508 are designed to receive at least a portion of a module, the openings may include different configurations that assist the alignment module 508 in shifting the modules to a desired location in the electronic device. For example, the first section 512 may include an extended portion 516 that includes a contoured region 518 that defines a reduced diameter of the opening 514 from a first end (such as the bottom end) to a second end (such as the top end) of the alignment module 508. Also, the extended portion 516 may wrap around a majority of the opening 514. In this manner, when a module (or a barrel of a module) extends through the first section 512, the extended portion 516—having a contoured region 518 that wraps around a majority of the opening 514—provides a relatively high precision, and minimal tolerance, alignment to the module. In this manner, the remaining modules may also be aligned with relatively high precision, as a result of the modules moving in harmony in the bracket assembly that carries the remaining modules and prevents relative movement of the modules. The second section 522 of the alignment module 508 may include an extended portion 526 that forms a generally semicircular design such that a diameter of the opening 524 in the second section 522 remains generally constant. In other words, the second section 522 does not include a contoured region. The second section 522 may be used to provide an angular alignment to a module when the module (or a barrel of the module) extends through the opening 524. The angular alignment provided by the second section 522 may compliment the high precision alignment of the first section 512, thereby providing precise and controlled alignment of the modules within an electronic device.

In addition to providing alignment to modules of a vision system, the alignment module 508 may be used to seat and align additional components. For example, an electronic device (not shown) that includes an alignment module 508 may further include an audio module 532 designed to emit acoustical energy in the form of audible sound. The audio module 532 may include a snout 536. The alignment module 508 may include an opening 534 that receives the snout 536. In order to prevent liquid ingress at the opening 534, a sealing element 538 may be positioned in the opening 534 and engaged with the snout 536. The sealing element 538 may include a liquid-resistant and compliant material, such as liquid silicone rubber.

An electronic device that includes the alignment module 508 may further include a microphone 542 designed to receive acoustical energy. In order to provide an acoustical pathway, the alignment module 508 may include an opening 544. As shown, the opening 544 may include a diagonal through hole opening. Also, an electronic device that includes the alignment module 508 may further include a sensor 546. In some embodiments, the sensor 546 includes an ambient light sensor designed to detect an amount light intensity incident on the electronic device. The sensor 546 may provide an input to the electronic device, with the input used to control an additional light source used by a vision system within the electronic device. This will be discussed below. In order to accommodate the sensor 546, the alignment module 508 may include a rail 540 designed to secure the sensor 546. Also, an electronic device that includes the alignment module 508 may further include a sensor 548. In some embodiments, the sensor 548 includes a proximity sensor that determines whether a user is approximately within a predetermined distance from the sensor 548. The sensor 548 can be used to provide an input to a processor (not shown in FIG. 10) of the electronic device that is used to, for example, control a display assembly (not shown in FIG. 10) of the electronic device. As an example, the input provided by the sensor 548 may correspond to a determination that the user is within predetermined distance of an electronic device (not shown in FIG. 10), with the input used as a determination whether the display assembly is on or off.

In some instances, the vision system may require additional lighting to provide reliable object recognition. As a result, an electronic device that includes the alignment module 508 may further include a lighting element 556. The alignment module 508 may include an opening 544 designed to receive the lighting element 556. In some embodiments, the lighting element 556 is a floodlight designed to illuminate during low-light conditions. The sensor 546 may determine when external light intensity incident on the electronic device, or a component of the electronic device (such as a transparent protective layer), constitutes a low-light condition, or a condition of relatively low external light. Also, in some instances, the alignment module 508 is formed from a molding operation, such as an injection molding operation. In this regard, a moldable plastic material may be used to form the alignment module 508. As a result, the alignment module 508 may include an overall relatively low strength, as compared to an all-metal alignment module. However, the alignment module 508 may include multiple rails that increase the strength and rigidity of the alignment module 508. For example, the alignment module 508 may include a first rail 558 and a second rail 562. The first rail 558 and the second rail 562 may include a metal. Also, during a molding operation of the alignment module 508, the first rail 558 and the second rail 562 may be inserted into a molded cavity (not shown). Accordingly, the first rail 558 and the second rail 562 may be referred to as insert molded elements. Also, the first rail 558 and the second rail 562 may define, or at least partially define, the opening 544.

Also, in some instances, the alignment module 508 may include a moldable material that blocks light within a certain spectrum. For example, in some embodiments, the alignment module 508 includes a material that blocks or shields some components from IR light. For example, the alignment module 508 may include an IR blocking material that blocks IR light having a wavelength of approximately 900 micrometers or higher. In this manner, the microphone 542 can be shielded from "noise" created by IR light.

Figure 10:
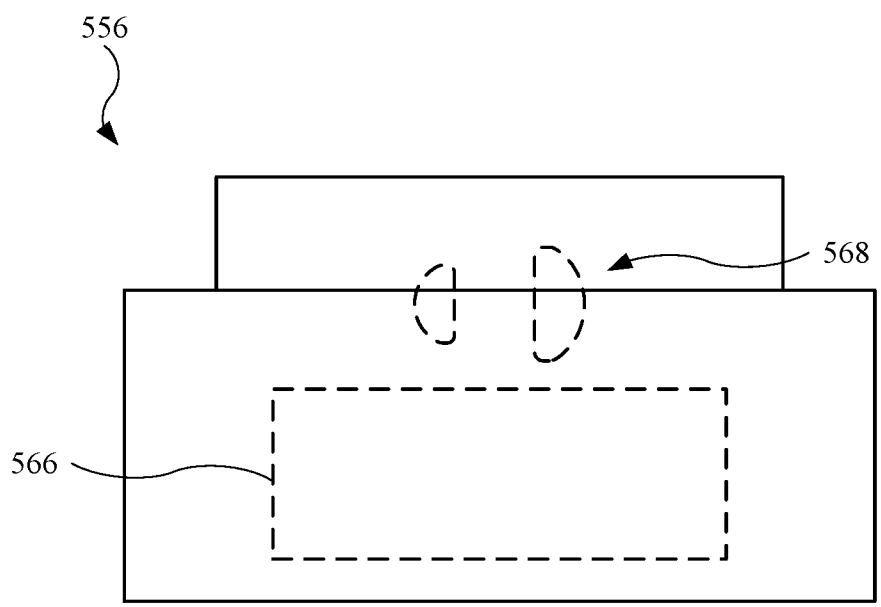
FIG. 10 illustrates a side view of the lighting element shown in FIG. 9, showing additional features of the lighting element.

FIG. 10 illustrates a side view of the lighting element 556 shown in FIG. 9, showing additional features of the lighting element 556. The lighting element 556 may include a light emitter 566 and a Doppler module 568. The light emitter 566 may include non-visible light, such as IR light. The Doppler module 568 is designed to detect motion. In this regard, the Doppler module 568 may assist in determining whether to activate the light emitter 566.

FIG. 11 illustrates a side view of an alignment module 608 positioned over a bracket assembly 640 and a vision system 610 positioned in the bracket assembly 640, prior to an assembly operation. The alignment module 608, the vision system 610, and the bracket assembly 640 may include any features described herein for an alignment module, a vision system, and a bracket assembly, respectively. As shown, the bracket assembly 640 includes a first section 662, a second section 664, and a third section 666 designed to interact with a first section 612, a second section 614, and a third section 616, respectively, of the alignment module 608. Also, the bracket assembly 640 is designed to carry a first camera module 672, a light emitting module 674, and a second camera module 676.

The alignment module 608 may align and/or carry several components, such as an audio module 632, a microphone 642, a sensor 646 (positioned behind the audio module 632), and a lighting element 656. The alignment module 608 may also align and/or carry a proximity sensor (not shown in FIG. 11). The alignment module 608 may be designed to position the aforementioned components at least partially in the third section 666 (or recessed section). Also, the audio module 632, the microphone 642, the sensor 646, and the lighting element 656 may electrically couple to a flexible circuit 660 that can electrically couple to a processor (not shown in FIG. 11). The first section 612 of the alignment module 608 may further include an opening 618 designed to receive a barrel 682 of the first camera module 672. The first section 612 may further include an extended portion 620 having a contoured region 622 (similar to the contoured region 518, shown in FIG. 9) that defines a reduced diameter of the opening 618 of the first section 612 from a first end (such as the bottom end) to a second end (such as the top end) of the alignment module 608, with the extended portion 620 wrapping around a majority of the opening 618. The second section 614 may include an opening 624 designed to receive a barrel 686 of the second camera module 676. The second section 614 of the alignment module 608 may include an extended portion 626 (similar to the extended portion 526, shown in FIG. 9) that forms a generally semicircular design such that a diameter of the opening 624 in the second section 614 remains generally constant.

During an assembly operation of an electronic device (not shown in FIG. 11), the alignment module 608, secured with a transparent cover (not shown in FIG. 11), is lowered down toward the vision system 610 and the bracket assembly 640. While the transparent cover is lowered, the alignment module 608 may contact the barrel 682 of the first camera module 672, as an example, and apply a force to the first camera module 672 that causes the bracket assembly 640, along with the components of the vision system 610, to shift to a desired location in the electronic device. This will be further shown below.

FIG. 12 illustrates a side view of the alignment module 608, the vision system 610, and the bracket assembly 640 shown in FIG. 11, further showing the alignment module 608 and several modules and components in relation to the alignment module 608, in accordance with some described embodiments. As shown, the alignment module 608 is positioned over and onto the bracket assembly 640. Also, the opening 618 of the first section 612 of the alignment module 608 may conform more closely to size and shape of the barrel 682 of the first camera module 672 (labeled in FIG. 11), as compared to the conformity of the opening 624 of the second section 614 with respect to the barrel 686 of the second camera module 676 (labeled in FIG. 11). In this regard, the alignment module 608 can provide a "fine," or precise, positioning of vision system 610 by using the opening 618 of the first section 612. Further, the alignment module 608 can provide an angular positioning of vision system 610 by using the opening 624 of the second section 614. Also, while the light emitting module 674 is generally not integrated with the alignment module 608, the light emitting module 674 can nonetheless be properly aligned based on the alignment module 608 shifting the bracket assembly 640, which corresponds to a shift and alignment of the light emitting module 674. Also, the alignment module 608 includes a rail 688 used to secure and align the sensor 646. As shown, the sensor 646 may be positioned between a portion of the alignment module 608 and the rail 688.

Figure 13:
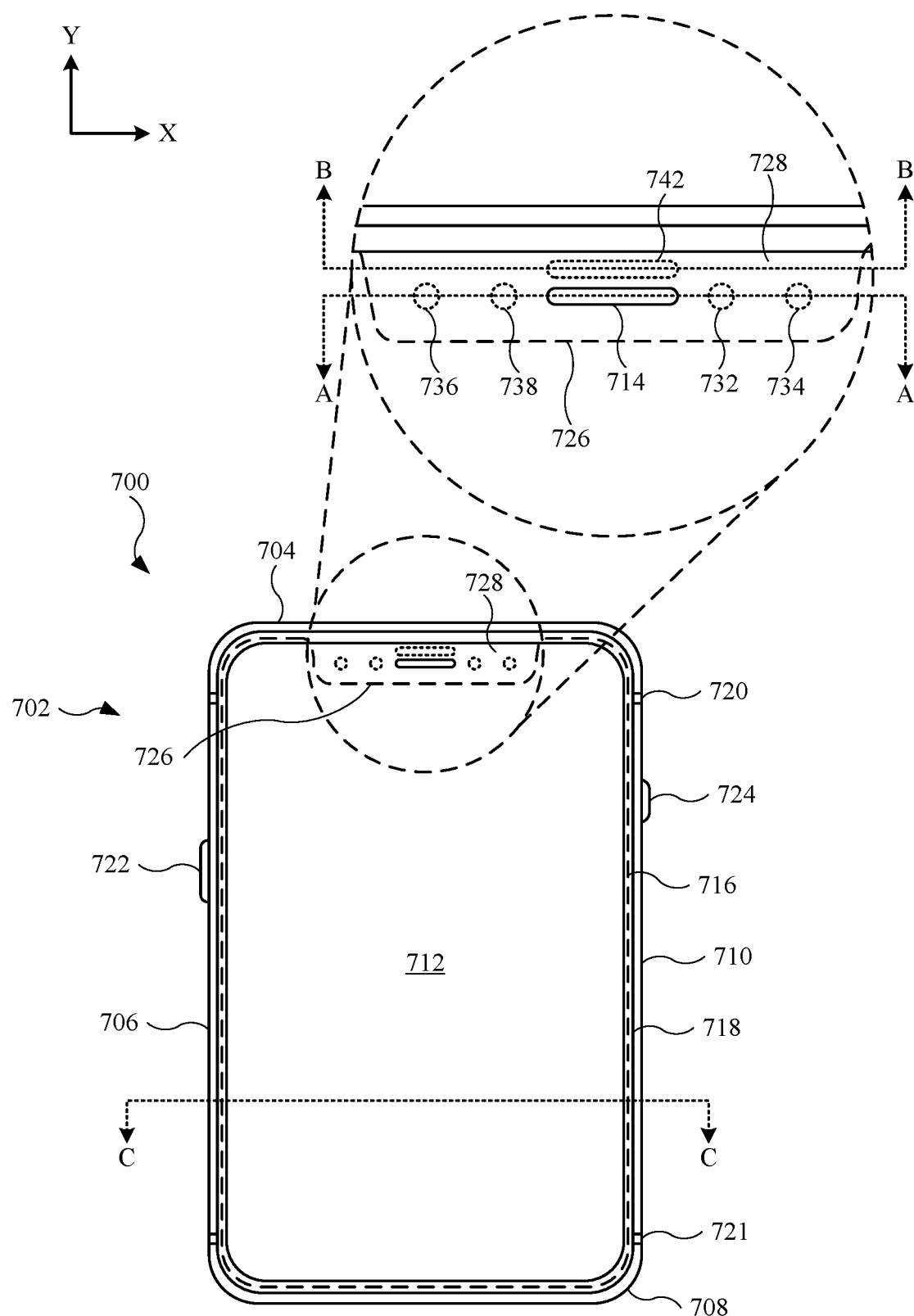
FIG. 13 illustrates a plan view of an embodiment of an electronic device, in accordance with some described embodiments.

FIG. 13 illustrates a plan view of an embodiment of an electronic device 700, in accordance with some described embodiments. In some embodiments, the electronic device 700 is a tablet computing device. In other embodiments, the electronic device 700 is a wearable electronic device. In the embodiment shown in FIG. 13, the electronic device 700 is a portable electronic device, commonly referred to as a smartphone. The electronic device 700 may include an enclosure 702 that includes a bottom wall (not shown) and several sidewall components, such as a first sidewall component 704, a second sidewall component 706, a third sidewall component 708, and a fourth sidewall component 710. The sidewall components may combine with the bottom wall to define an internal volume, or cavity, to hold the internal components of the electronic device 700. In some embodiments, the bottom wall includes a non-metal, such as glass, plastic, or other transparent material. Also, in some embodiments, the first sidewall component 704, the second sidewall component 706, the third sidewall component 708, and the fourth sidewall component 710 include a metal, such as steel (including stainless steel), aluminum, or an alloy that includes aluminum and/or steel. Further, each of the aforementioned sidewall components may be separated and isolated from each other by a filler material that includes a non-metal such that the sidewall components are electrically isolated from each other. For example, the enclosure 702 may include a first filler material 720 that separates the first sidewall component 704 from the second sidewall component 706 and the fourth sidewall component 710. The enclosure 702 may further include a second filler material 721 that separates the third sidewall component 708 from the second sidewall component 706 and the fourth sidewall component 710. The first filler material 720 and the second filler material 721 may include a molded plastic and/or a molded resin. In some instances, at least one of first filler material 720 and the second filler material 721 includes an antenna component (not shown in FIG. 13).

The electronic device 700 may further include a transparent cover 712 that secures over the enclosure 702, and in particular, the aforementioned sidewall components of the enclosure 702. In this regard, the first sidewall component 704, the second sidewall component 706, the third sidewall component 708, and the fourth sidewall component 710 may provide an edge region that defines an opening that receives the transparent cover 712. The transparent cover 712 may include a material such as glass or sapphire, or another suitable transparent material. When formed from glass, the transparent cover 712 may be referred to as a cover glass. Also, the transparent cover 712 may further include a through hole 714, or opening. The through hole 714 is labeled in the enlarged view. The electronic device 700 may further include an audio module (for example, the audio module 532 shown in FIG. 9) aligned with the through hole 714 in order to allow acoustical energy generated from the audio module to exit the electronic device 700 via the through hole 714. The electronic device 700 may further include a display assembly 716 (shown as a dotted line) that is covered or overlaid by the transparent cover 712. Accordingly, the transparent cover 712 may be referred to as a protective layer. The display assembly 716 may include multiple layers, with each layer serving one or more particular functions. This will be further shown below. The electronic device 700 may further include a display cover 718 that is covered by the transparent cover 712 and defines a border around the display assembly 716. In particular, the display cover 718 may substantially cover an outer edge of the display assembly 716. The electronic device 700 may include control inputs. For example, the electronic device 700 may include a first button 722 and a second button 724, each of which is design to allow for a user input to control the display assembly 716. The first button 722 and/or the second button 724 may be used to actuate a switch (not shown in FIG. 13), thereby generating an input to a processor (not shown in FIG. 13).

As shown, the transparent cover 712 may include a rectilinear design defined by the sidewall components of the enclosure 702. However, in some instances, as shown in FIG. 13, the display assembly 716 (and at least some of its associated layers) may include a notch 726 formed in the display assembly 716. The notch 726 is also labeled in the enlarged view. The notch 726 may represent a reduced surface area of the display assembly 716 (as compared to that of the transparent cover 712). The electronic device may include a masking layer 728 applied to the underside, or bottom surface, of the transparent cover 712 in a location corresponding to the notch 726. The masking layer 728 may include an ink material (or materials) that provides an appearance (in terms of color) that is substantially similar to the appearance of the display assembly 716 (when the display assembly 716 is off). For example, both the masking layer 728 and the display assembly 716 may include a dark appearance that resembles black. Also, in some instances, the display cover 718 may include an appearance (in terms of color) that is similar to both the masking layer 728 and the display assembly 716 (when the display assembly 716 is off).

Generally, the masking layer 728 includes an opaque material that blocks the passage of light, and accordingly, may obscure vision into the electronic device 700. However, the masking layer 728 may include several openings that represent a void in the masking layer 728. For example, as shown in the enlarged view, the masking layer 728 may include a first opening 732 and a second opening 734. When the electronic device 700 includes a vision system (such as the vision system 610 shown in FIG. 11), the first camera module (such as the first camera module 672 shown in FIG. 11) and the light emitting module (such as the light emitting module 674 shown in FIG. 11) may align with the first opening 732 and the second opening 734, respectively. The masking layer 728 may further include a third opening 736 and a fourth opening 738. The vision system (such as the vision system 610 shown in FIG. 11) may include a second camera module (such as the second camera module 676 shown in FIG. 11) and a lighting element (such as the lighting element 656 shown in FIG. 11) that align with the third opening 736 and the fourth opening 738, respectively. The masking layer 728 may further include a fifth opening 742. When the electronic device 700 includes a sensor (such as the sensor 646 shown in FIG. 11), the sensor may align with the fifth opening 742. Also, in order to provide consistency, the size and shape of the through hole 714 (in the x-y plane) may be identical, or at least substantially similar, to that of the fifth opening 742. While the masking layer 728 is shown as having several openings, each of the openings may be filled with a material that provides at least some masking and/or some consistency in appearance (in terms of color). In this regard, the openings may be not be easily seen by a user, thereby hiding the sensor and the modules of the vision system, and the overall consistency of the electronic device 700 is at least partially maintained in terms of appearance. Also, as shown in the enlarged view, the first opening 732, the second opening 734, the third opening 736, and the fourth opening 738 may be centered with the masking layer 728 in both the X- and Y-dimensions. Further, the through hole 714 and the fifth opening 742 may be centered with respect to the masking layer 728 in both the X- and Y-dimensions.

Figure 14:
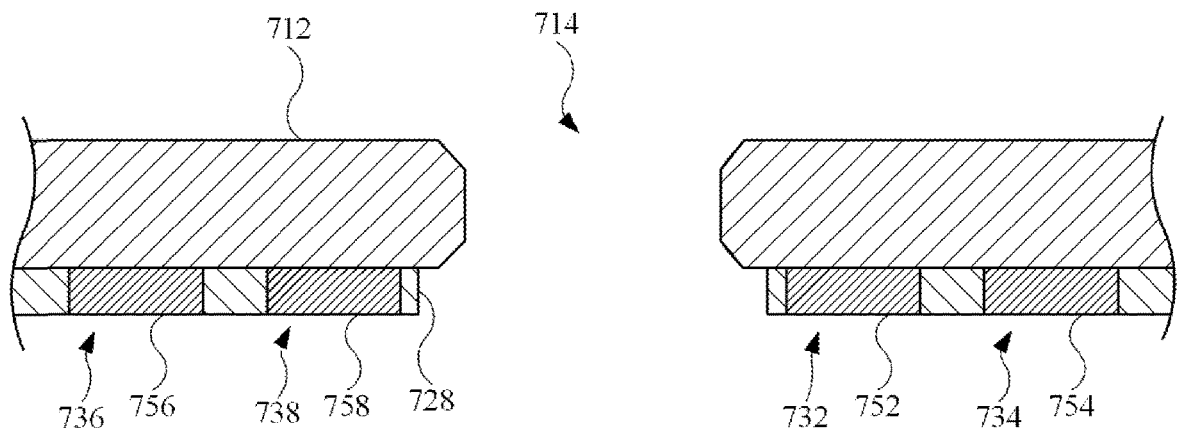
FIG. 14 illustrates a cross sectional view taken along line A-A in FIG. 13, showing a location of the transparent cover, the masking layer secured with the transparent cover, and several layers of material secured with the transparent cover, in accordance with some described embodiments.

However, the materials used to cover the openings of the masking layer 728 may differ. For example, FIG. 14 illustrates a cross sectional view taken along line A-A in FIG. 13, showing a location of the transparent cover 712, the masking layer 728 secured with the transparent cover 712, and several layers of material secured with the transparent cover 712, in accordance with some described embodiments. As shown, the openings of the masking layer 728 may be filled. For example, the first opening 732, the second opening 734, the third opening 736, and the fourth opening 738 may include a first material 752, a second material 754, a third material 756, and a fourth material 758, respectfully. In some embodiments, the first material 752, the second material 754, the third material 756, and the fourth material 758 include an ink material that permits IR light passage, while blocking other forms of light (outside the IR frequency range of light). This allows modules (not shown) of a vision system to emit IR light through the aforementioned materials and the transparent cover 712, while also allowing reflected IR light to enter through the transparent cover 712 and the aforementioned materials such that the IR light is received by some of the modules (such as the second camera module 676, shown in FIG. 11). Generally, the material used to fill the openings may include any material that permits light passage associated with light emitted by the modules of the vision system, while blocking other types of light that does not fall within a predetermined frequency range. Also, in some embodiments, the openings are symmetrically displaced around the through hole 714. For example, the first opening 732 may be displaced from the through hole 714 at a distance that is the same as that between the fourth opening 738 and the through hole 714. Also, the second opening 734 may be displaced from the through hole 714 at a distance that is the same as that between the third opening 736 and the through hole 714.

Figure 15:
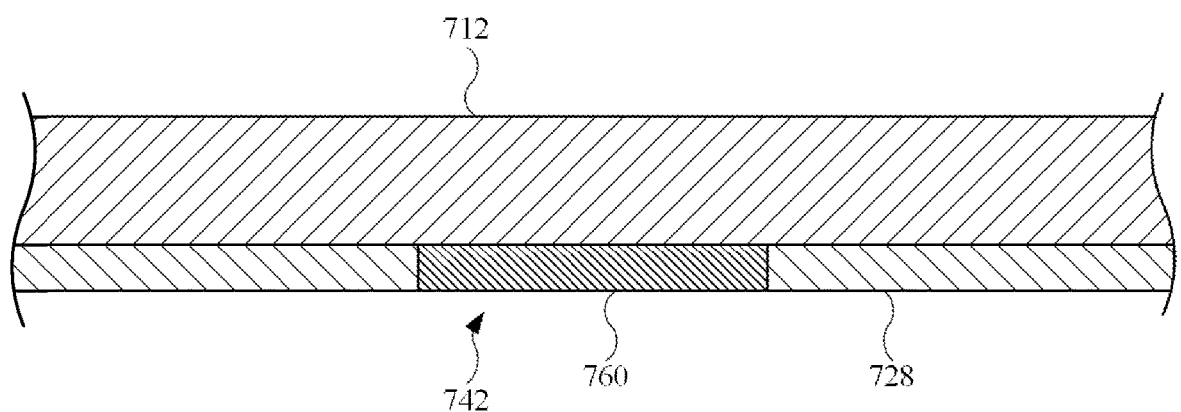
FIG. 15 illustrates a cross sectional view taken along line B-B in FIG. 13, showing a different location of the transparent cover and a material positioned in an opening of the masking layer.

FIG. 15 illustrates a cross sectional view taken along line B-B in FIG. 13, showing a different location of the transparent cover 712 and a material positioned in an opening of the masking layer 728. As shown, the fifth opening 742 may be filled by a fifth material 760. In some embodiments, the fifth material 760 includes a material that permits visible light passage, while blocking other forms of light. This allows a sensor (such as the sensor 646 shown in FIG. 11) to receive visible light through the fifth material 760 and the transparent cover 712. Referring again to FIG. 14, the first material 752, the second material 754, the third material 756, the fourth material 758, and the fifth material 760 (shown in FIG. 15) may not only provide a specific function of light passage, but also may provide an appearance (in terms of color) that at least partially resembles the appearance of the masking layer 728. In this manner, the materials that fill the openings can generally blend with the masking layer 728, in terms of appearance, such that the openings are less noticeable.

Figure 16:
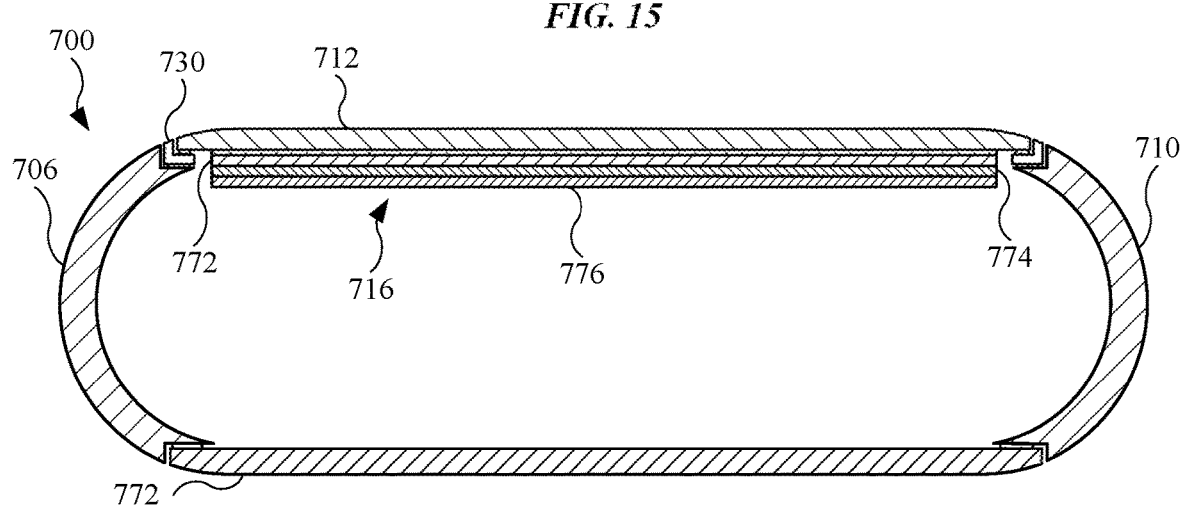
FIG. 16 illustrates a cross sectional view of the electronic device taken along line C-C in FIG. 13, showing various layers of the display assembly.

FIG. 16 illustrates a cross sectional view of the electronic device 700 taken along line C-C in FIG. 13, showing various layers of the display assembly 716. For purposes of illustration and simplicity, several components (such as a circuit board, battery, rear camera, flexible circuits) are removed. As shown, the transparent cover 712 may secure with the sidewall components (the second sidewall component 706 and the fourth sidewall component 710 are shown) by way of a frame 730 that is adhesively secured with both the transparent cover 712 and the sidewall components by an adhesive (not labeled), which may include pressure sensitive adhesive. The display assembly 716 may include a touch input layer 772 designed to form a capacitive coupling by way of a touch input to the transparent cover 712. The display assembly 716 may further include a display layer 774 designed to present visual information in the form of textual information, still images, and/or video images. An input to the touch input layer 772 may generate a control input to control what is presented on the display layer 774. The display assembly 716 may further include a force touch layer 776 designed to determine an amount of force applied to the transparent cover 712. A control input can be generated when the force applied to the transparent cover 712 equals or exceeds a predetermined amount of force, as determined by the force touch layer 776.

Figure 17:
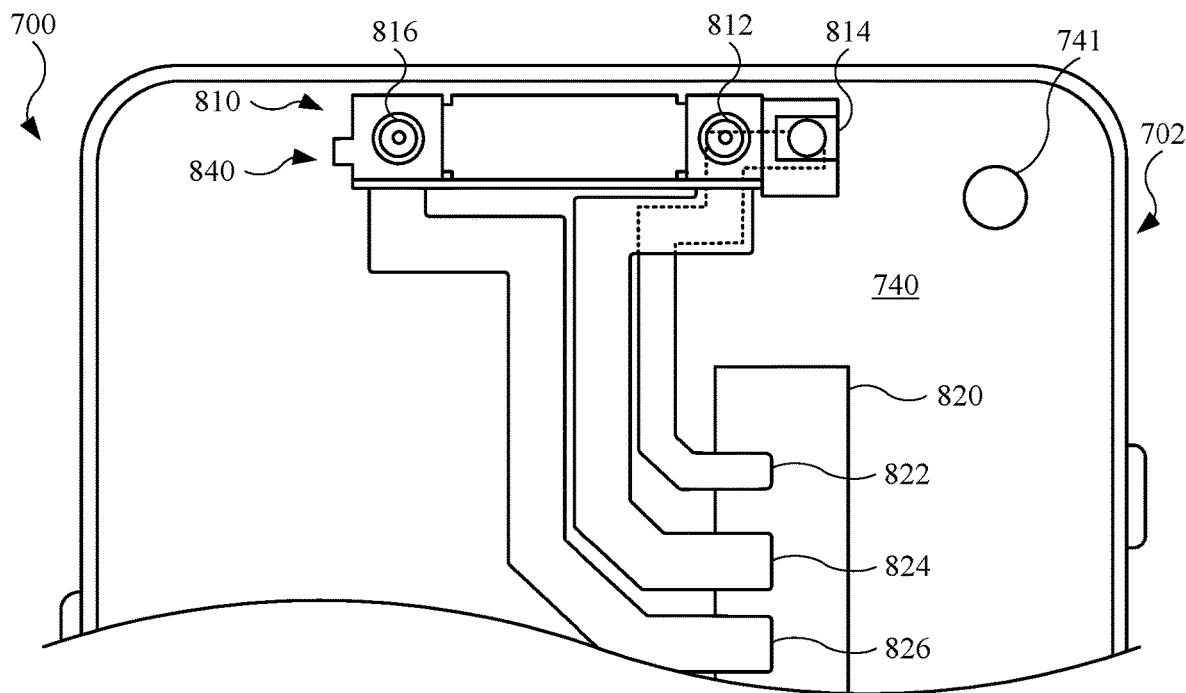
FIG. 17 illustrates a plan view of the electronic device shown in FIG. 13, with the transparent cover and the display assembly removed.

FIG. 17 illustrates a plan view of the electronic device 700 shown in FIG. 13, with the transparent cover and the display assembly removed. As shown, the electronic device 700 includes a bracket assembly 840 that carries a vision system 810 positioned in the enclosure 702. The bracket assembly 840 and the vision system 810 may include any features described herein for a bracket assembly and a vision system, respectively. As shown, the vision system 810 includes a first camera module 812, a light emitting module 814, and a second camera module 816. The first camera module 812, the light emitting module 814, and the second camera module 816 may include any features described herein for a first camera module, a light emitting module, and a second camera module, respectively. The bracket assembly 840 is not only designed to carry and protect the aforementioned modules, but also to maintain a predetermined distance or separation between the modules and limit or prevent relative movement of the modules with respect to other modules.

The electronic device 700 may further include a circuit board 820 that includes one or more processor circuits (not shown), such as integrated circuits, that provide the main processing functions of the electronic device 700. Each module may include a flexible circuit that electrically couples to the circuit board 820. For example, the first camera module 812 includes a first flexible circuit 822 used to electrically couple the first camera module 812 to the circuit board 820, the light emitting module 814 may include a second flexible circuit 824 used to electrically couple the light emitting module 814 to the circuit board 820, and the second camera module 816 may include a third flexible circuit 826 used to electrically couple the second camera module 816 to the circuit board 820. With the exception of the electrical and mechanical connections between the circuit board 820 and the aforementioned flexible circuits of the modules, no mechanical connections exist between the bracket assembly 840 and the enclosure 702 (or another other structural features in the enclosure 702). Accordingly, the bracket assembly 840 is allowed to "roam" or "float" (that is, move) in the enclosure 702 prior to a final assembly. However, when the transparent cover 712 (shown in FIG. 13) is secured with the enclosure 702, the bracket assembly 840 can be aligned in the enclosure 702 and generally limited in movement. This will be further shown and discussed below. Also, the enclosure 702 may include a bottom wall 740, or back wall. The bottom wall 740 may be integrally formed with the sidewall components to define a unibody structure, or may include a separate structural material(s) that are coupled together during an assembly operation. Also, the bottom wall 740 may include an opening 741 that allow an additional camera module (not shown in FIG. 17) to captures images. The additional camera module can be designed to capture images in a direction opposite to that of the first camera module 812.

Figure 18:
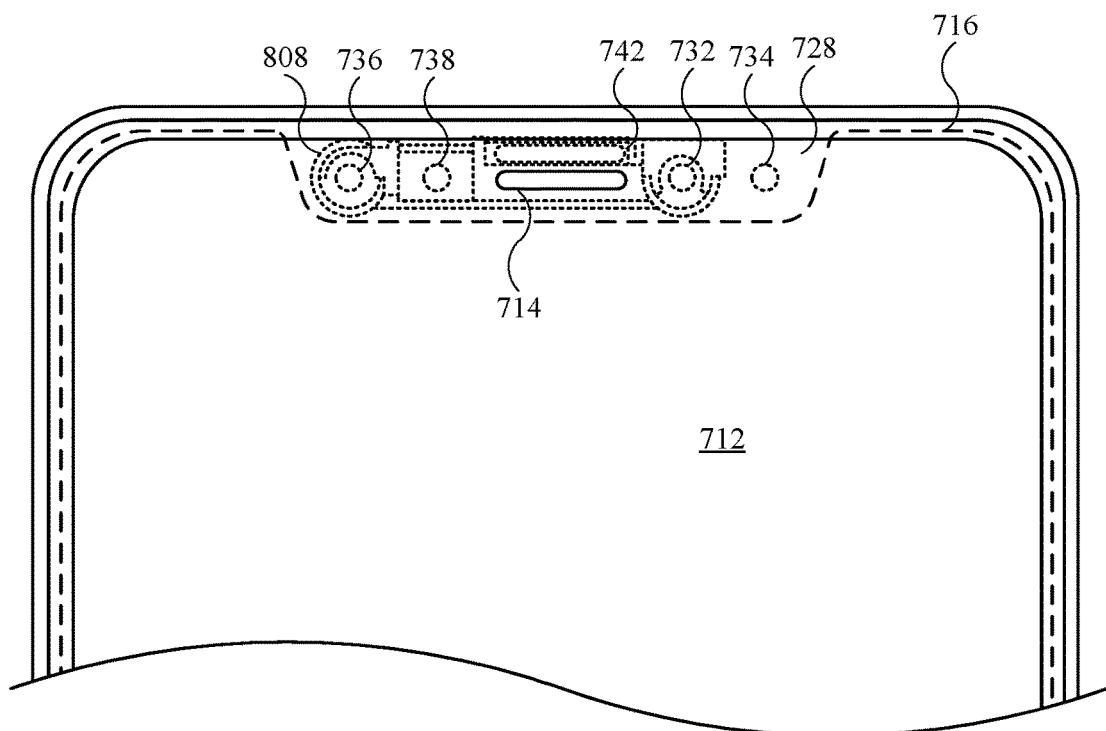
FIG. 18 illustrates a plan view of the transparent cover shown in FIG. 13, further showing an alignment module secured with the transparent cover.

FIG. 18 illustrates a plan view of the transparent cover 712 shown in FIG. 13, further showing an alignment module 808 secured with the transparent cover 712. The alignment module 808 (shown as dotted lines) is secured with an underside (also referred to as a rear surface or backside) of the transparent cover 712 by, for example, an adhesive. Also, the alignment module 808 may include any features described herein for an alignment module. The alignment module 808 may be secured with the transparent cover 712, and may provide a desired alignment of the vision system 810 (shown in FIG. 17). For example, while the transparent cover 712 is being assembly with the enclosure 702 (shown in FIG. 17), the alignment module 808 can align the first camera module 812 and the light emitting module 814 (both shown in FIG. 17) with the first opening 732 and the second opening 734, respectively, of the masking layer 728. Further, when the transparent cover 712 is secured with the enclosure 702 (shown in FIG. 17), the alignment module 808 can align the second camera module 816 (shown in FIG. 17) with the third opening 736 of the masking layer 728. The materials that fill the openings (shown in FIGS. 14 and 15) are not labeled in FIG. 18 for purposes of simplicity. Although not shown, additional components can be aligned using the alignment module 808. For example, the alignment module 808 may align a lighting element (such as the lighting element 556 shown in FIG. 9) with the fourth opening 738. The alignment module 808 may further align an audio module and a microphone (such as the audio module 532 and the microphone 542 shown in FIG. 9) with the through hole 714 of the transparent cover 712. The alignment module 808 may further align a sensor (such as the sensor 546 shown in FIG. 9) with the fifth opening 742.

Figure 19:
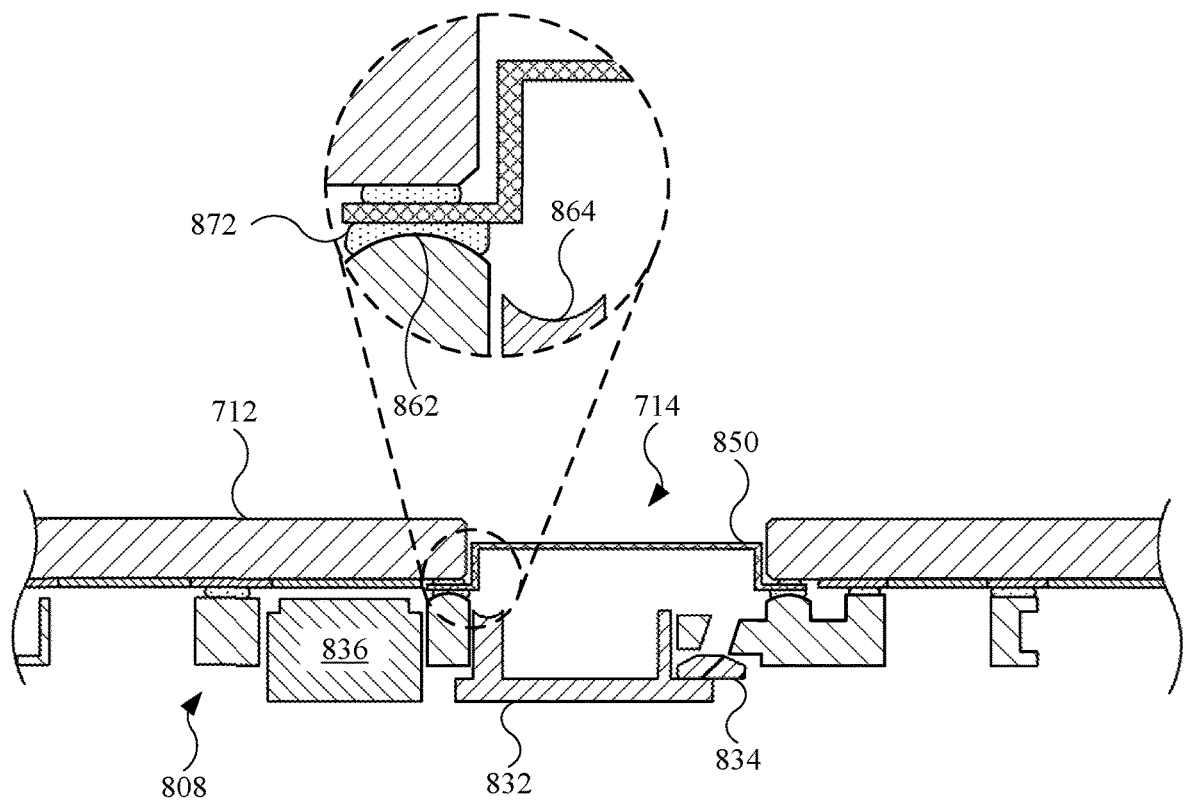
FIG. 19 illustrates a cross sectional view of the transparent cover and the alignment module secured with the transparent cover, further showing an audio module, a microphone, and a lighting element.

While the bracket assembly 840 is designed to carry the vision system 810 (both shown in FIG. 17), the alignment module 808 is also designed to carry components (in addition to providing alignment to the components). For example, FIG. 19 illustrates a cross sectional view of the transparent cover 712 and the alignment module 808 secured with the transparent cover 712, further showing an audio module 832, a microphone 834, and a lighting element 836. The audio module 832, the microphone 834, and the lighting element 836 may include any features described herein for an audio module, a microphone, and a lighting element, respectively. Although not shown, a sensor may be carried by the alignment module 808 in a manner previously described. In order to hide the audio module 832 and the microphone 834 from view, an acoustic mesh 850 may secure (by adhesives, for example) to the transparent cover 712 and cover the through hole 714, thereby covering the audio module 832 and the microphone 834. The acoustic mesh 850 may include a material that permits acoustical energy to pass through the acoustic mesh 850. As shown, the alignment module 808 may align the audio module 832 and the microphone 834 with the through hole 714 to allow the audio module 832 and the microphone 834 to access the ambient environment.

In some instances, the alignment module 808 may be modified to provide additional surface area. For example, as shown in the enlarged view, the alignment module 808 may include a rib 862 designed to receive an adhesive 872 that secures the alignment module 808 with the transparent cover 712. As shown, the acoustic mesh 850 is positioned between the alignment module 808 and the transparent cover 712. However, in some embodiments (not shown), the acoustic mesh 850 is not positioned between the alignment module 808 and the transparent cover 712. The rib 862 may provide the alignment module 808 with additional surface area, thereby allowing for additional space for the adhesive 872. This may prevent the adhesive 872 from flowing into the audio module 832 and altering the acoustical energy emitted by the audio module 832 in an undesired manner. Although not labeled, the alignment module 808 may include additional ribs designed in a manner similar to that of the rib 862. In some embodiments, the audio module 832 includes a recessed region 864, or trough, that is proximate to the rib 862. In this manner, if the adhesive 872 extends beyond the rib 862, the adhesive 872 may be caught or trapped in the recessed region 864, and the adhesive 872 remains out of the audio module 832.

Figure 20:
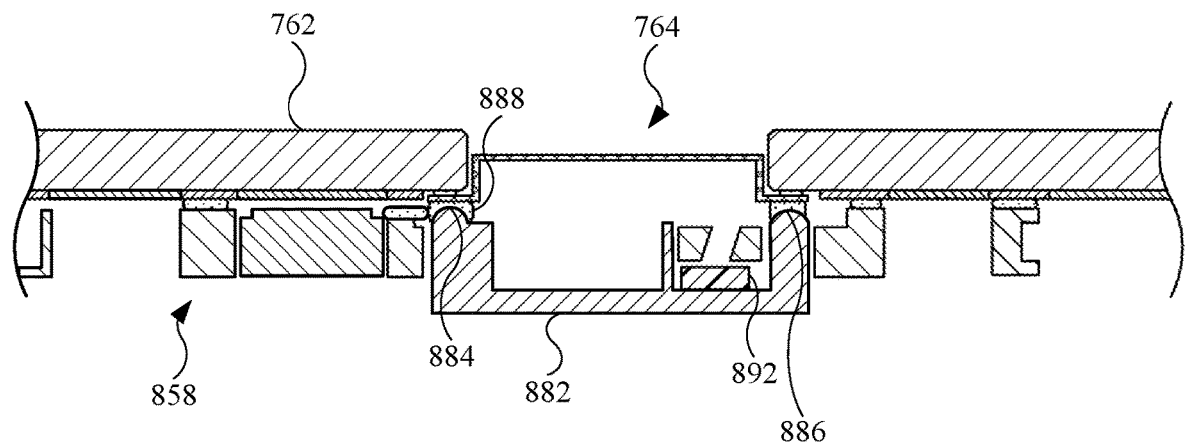
FIG. 20 illustrates a cross sectional view of an alternate embodiment of a transparent cover and an alignment module secured with the transparent cover, further showing an audio module that is modified to secure to the transparent cover.

FIG. 20 illustrates a cross sectional view of an alternate embodiment of a transparent cover 762 and an alignment module 858 secured with the transparent cover 762, further showing an audio module 882 that is modified to secure to the transparent cover 762. The transparent cover 762, the alignment module 858, and the audio module 882 may include any features previously described for a transparent cover, an alignment module, and an audio module, respectively. As shown, the audio module 882 may be extended (as compared to the audio module 832 shown in FIG. 19) and may include ribs, such as a first rib 884 and a second rib 886, used to receive an adhesive 888. Rather than modifying the alignment module 858, the audio module 882, by way of the first rib 884 and the second rib 886, can adhesively secure to the transparent cover 762. Also, the audio module 882 may be modified to carry a microphone 892 such that both the audio module 882 and the microphone 892 can access the ambient environment via a through hole 764 of the transparent cover 762.

Figure 21:
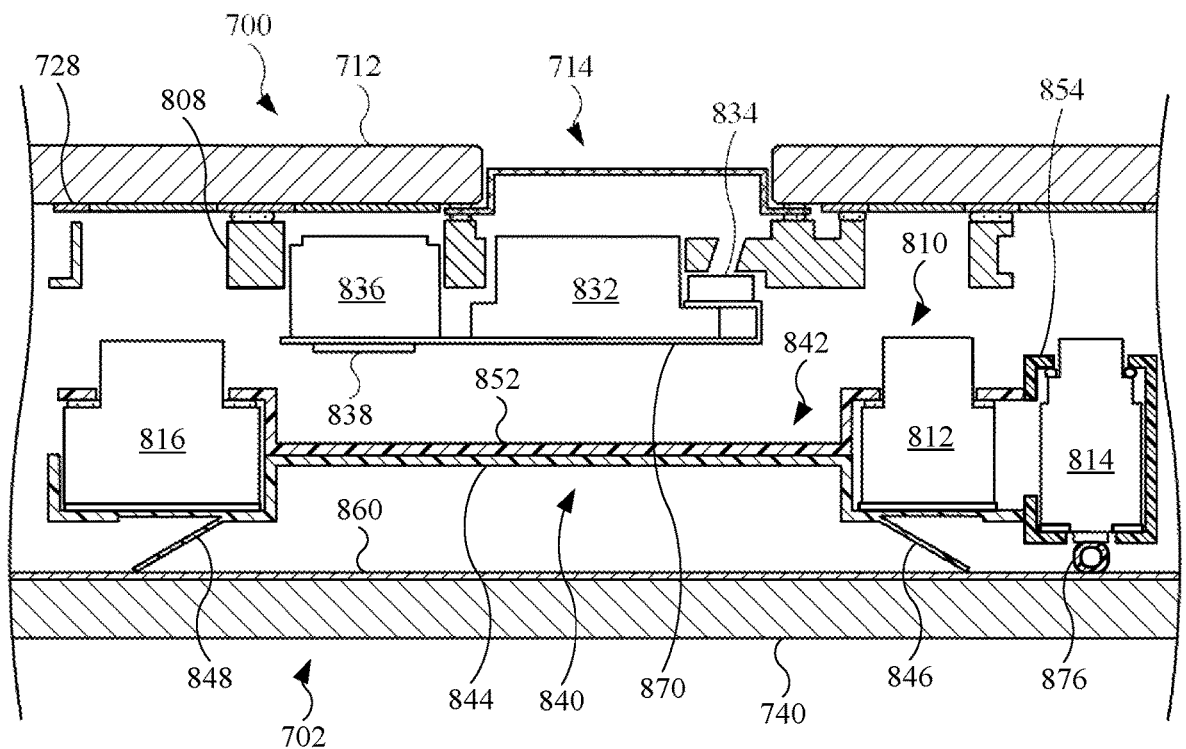
FIG. 21 illustrates a cross sectional view partially showing the electronic device shown in FIG. 13, showing an assembly operation between the transparent cover and the enclosure, in accordance with some described embodiments.
Figure 22:
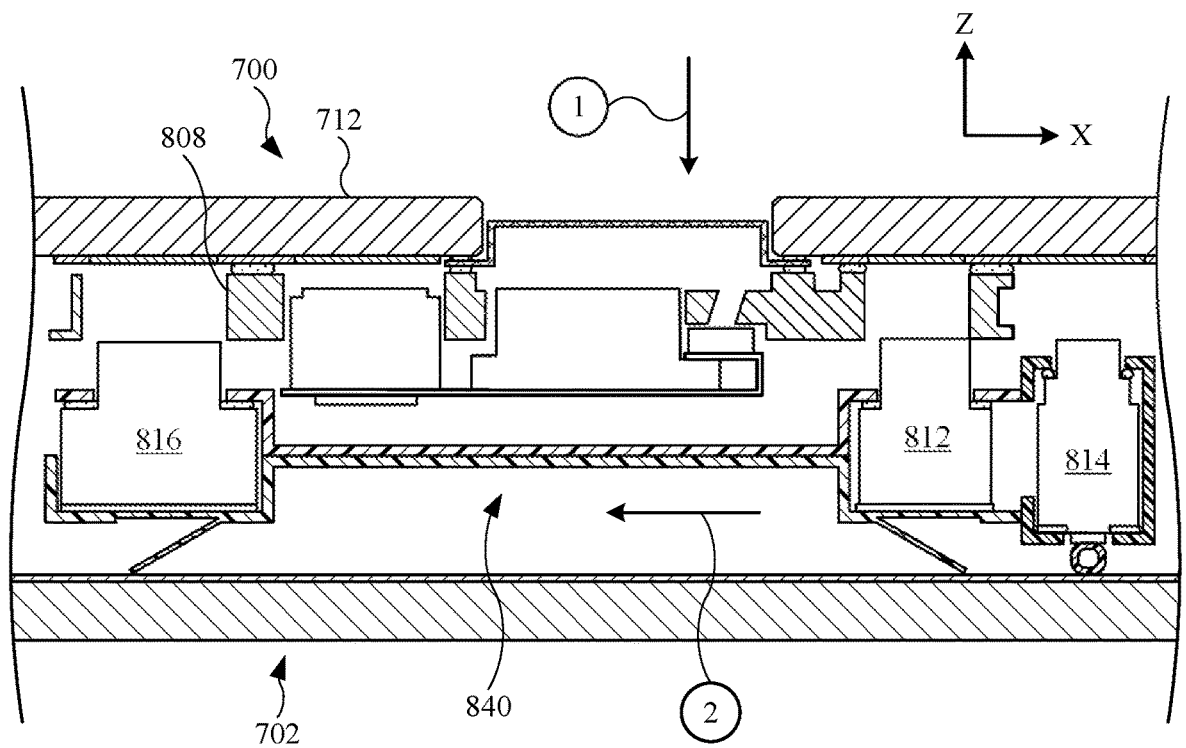
FIG. 22 illustrates a cross sectional view of the electronic device shown in FIG. 21, further showing the transparent cover being lowered toward the enclosure.
Figure 23:
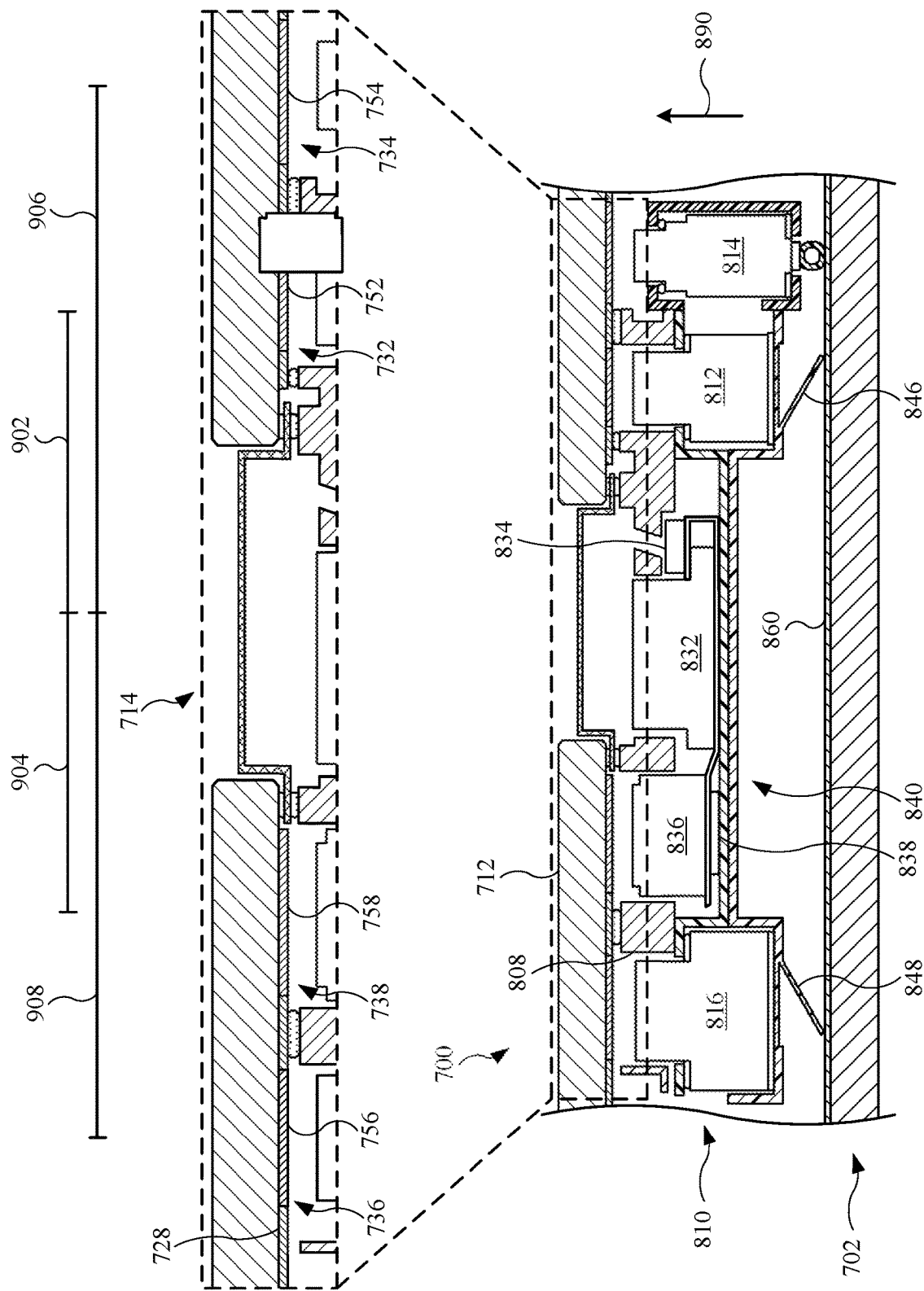
FIG. 23 illustrates a cross sectional view of the electronic device shown in FIG. 22, with the transparent cover secured with the enclosure.

FIGS. 21-23 illustrate an assembly operation of the electronic device 700. In order to properly align the vision system 810 in a desired manner, the bracket assembly 840 is placed in the enclosure 702 and is not affixed to the enclosure 702. In other words, the bracket assembly 840 is (initially) free to move relative to the enclosure 702. During the assembly operation, the alignment module 808 may engage one of the modules of the vision system 810, which in turn provides a lateral moving force of the vision system 810 and the bracket assembly 840 in order to align the vision system 810 with openings in the masking layer 728. Once the assembly operation is complete, the bracket assembly 840 may be in a fixed positioned in the enclosure 702 by engagement forces from the alignment module 808 and the enclosure 702, but is not otherwise affixed to the enclosure 702 by fasteners, clips, screws, adhesives, etc.

FIG. 21 illustrates a cross sectional view partially showing the electronic device 700 shown in FIG. 13, showing an assembly operation between the transparent cover 712 and the enclosure 702, in accordance with some described embodiments. The electronic device 700 may include a circuit 870 that is electrically and mechanically coupled to the audio module 832, the microphone 834, the lighting element 836, and a sensor (not shown in FIG. 21). The circuit 870 may include a flexible circuit that is electrically and mechanically connected to a circuit board (such as the circuit board 820 shown in FIG. 17), thereby placing the audio module 832, the microphone 834, the lighting element 836, and the sensor in communication with the circuit board. Also, the alignment module 808 is adhesively secured with the transparent cover 712. The alignment module 808 is aligned with the transparent cover 712 such that when the audio module 832 is positioned in an opening (not labeled) of the alignment module 808, the audio module 832 is aligned with the through hole 714 of the transparent cover 712. Further, the microphone 834 may be aligned with a diagonal opening (not labeled) of the alignment module 808, and at least partially aligned with the through hole 714. Also, the lighting element 836 may be positioned in an opening (not labeled) of the alignment module 808, and in particular, the lighting element 836 may align with an opening of the masking layer 728. This will be further discussed below. Also, the lighting element 836 may include a heat dissipation structure 838 designed to draw heat from the lighting element 836 during use of the lighting element 836, thereby providing a thermal sink to prevent overheating of the lighting element 836. The heat dissipation structure 838 may be coupled with the circuit 870.

The bracket assembly 840 may include a first bracket 842 and a second bracket 844 secured with the first bracket 842 to hold the first camera module 812, the light emitting module 814, and the second camera module 816 of the vision system 810. Although not labeled, the first camera module 812, the light emitting module 814, and the second camera module 816 may each include a flexible circuit. Also, although not labeled, the first camera module 812, the light emitting module 814, and the second camera module 816 may each include an adhesive that secures the modules to the bracket assembly 840. The adhesive may include an electrically conductive adhesive that electrically couples the modules to the bracket assembly 840. The first bracket 842 may include a multi-piece assembly, similar to the bracket 242 (shown in FIG. 4). In this regard, the first bracket 842 may include a first bracket part 852 and a second bracket part 854 secured with the first bracket part 852. The second bracket part 854 may be referred to as a module carrier that holds the light emitting module 814. The first bracket part 852 may attach to the second bracket 844 and the second bracket part 854 by welding, as an example, thereby electrically coupling the brackets and the parts together. Other attachment methods that electrically couple the brackets and parts together are possible. The second bracket 844 may include a first spring element 846 and a second spring element 848 that are used to support the bracket assembly 840 and the vision system 810.

The bottom wall 740 may include a transparent material, such as glass or the like. In this regard, the bottom wall 740 may include a material that is different from the sidewall components shown in FIG. 13. However, in some embodiments (not shown), the bottom wall 740 is formed from a metal and the sidewall components (also formed from the metal) are integrally formed from the bottom wall 740. Although not shown, the bottom wall 740 may include a mask that provides an opaque material across a major surface of the bottom wall 740. Also, the first spring element 846 and the second spring element 848 may engage a metal layer 860 disposed on the bottom wall 740. As a result, the metal layer 860 may provide an electrical ground for the first camera module 812, the light emitting module 814, and the second camera module 816 by way of adhesives and various structural features of the bracket assembly 840, including the aforementioned spring elements. In some instances, the metal layer 860 is electrically coupled to the sidewall components (shown in FIG. 13).

The second bracket 844 may include an opening that allows a heat sinking element 876 to thermally couple with the light emitting module 814, either by direct contact with the light emitting module 814 or by way of a block (not labeled), as shown in FIG. 21. The heat sinking element 876 may include a rolled graphite layer that is thermally coupled to the metal layer 860. Accordingly, the metal layer 860 may provide electrical and thermal dissipation. Regarding the latter, the metal layer 860 may be referred to as a heat sink or thermal regulator.

FIG. 22 illustrates a cross sectional view of the electronic device 700 shown in FIG. 21, further showing the transparent cover 712 being lowered toward the enclosure 702. As shown in Step 1, the transparent cover 712 moves in a direction toward the enclosure 702 in order to secure the transparent cover 712 to the enclosure 702. As the transparent cover 712 is lowered, the alignment module 808 may engage a module of the vision system 810 (labeled in FIG. 21). For example, as shown in FIG. 22, the alignment module 808 engages the first camera module 812. As shown in Step 2, the force provided by the alignment module 808 to the first camera module 812 (by way of the transparent cover 712 moving toward the enclosure 702) causes the first camera module 812 to shift in the x-direction, which in turn causes the bracket assembly 840 and the remaining modules to shift along the X-axis (in the "negative" direction). The shifting, or movement, of the modules causes the modules to align in the electronic device 700 in a desired manner. This will be shown below. In this manner, the first camera module 812 may be referred to as an alignment feature that is used by the alignment module 808 to align the modules. However, in some embodiments (not shown in FIG. 22), the alignment module 808 engages a different module of the bracket assembly 840. Also, it should be noted that despite the movement or shifting of the modules, the bracket assembly 840 maintains the spacing between i) the first camera module 812 and the second camera module 816, ii) light emitting module 814 and the second camera module 816, and iii) the first camera module 812 and the light emitting module 814.

While Step 2 shows the bracket assembly 840 and the modules being shifted in a particular direction, the bracket assembly 840 and the modules may shift in a different direction based the original position of the bracket assembly 840 and the modules in the electronic device 700. For example, when the alignment module 808 engages a different location of the first camera module 812 (as opposite the location shown in FIG. 22), the bracket assembly 840 and the modules may shift in the opposite direction in order to align the modules in the electronic device 700. Further, although not shown, the engagement between the alignment module 808 and the first camera module 812 may provide a force that causes the bracket assembly 840 and the modules to move in a direction perpendicular to the X-Z plane, such as a "Y-direction" that is into and out of the page. The engagement between the alignment module 808 and the first camera module 812 may provide a force that causes the bracket assembly 840 and the modules to move in two directions, such as along the X-axis as well as a direction perpendicular to the X-Z plane. Accordingly, in order to properly align the modules, the alignment module 808 may provide a force that moves the modules in two different dimensions.

FIG. 23 illustrates a cross sectional view of the electronic device 700 shown in FIG. 22, with the transparent cover 712 secured with the enclosure 702. The vision system 810 is aligned with the electronic device 700 subsequent to the alignment module 808 causing the vision system 810 and the bracket assembly 840 to shift. Further, as shown in the enlarged view, when the vision system 810 is aligned in the electronic device 700, the first camera module 812 is aligned with the first material 752 disposed in the first opening 732 of the masking layer 728. The term "aligned" refers to the first material 752 being positioned over the first camera module 812 such that the masking layer 728 does not block the line of view for the first camera module 812. Also, the light emitting module 814 is aligned with the second material 754 disposed in the second opening 734 of the masking layer 728, and the second camera module 816 is aligned with the third material 756 disposed in the third opening 736 of the masking layer 728. Also, the lighting element 836, when positioned in the alignment module 808, is aligned with the fourth material 758 disposed in the fourth opening 738 of the masking layer 728.

Also, the first spring element 846 and the second spring element 848 may flex in response to compression forces from the transparent cover 712 and the enclosure 702. However, the first spring element 846 and the second spring element 848 may provide a biasing force, or counterforce, in a direction of an arrow 890. The biasing force may increase the engagement force between the bracket assembly 840 and the alignment module 808. As a result, the bracket assembly 840 may be held in place without any direct fixtures or fasteners that permanently fasten the bracket assembly 840 to the enclosure 702 or the transparent cover 712. In this manner, the vision system 810 is mechanically isolated from the enclosure 702, as the components of the vision system 810 are suspended by the bracket assembly 840 (which is not affixed to the enclosure 702) such that the components of the vision system 810 are not in contact with the enclosure 702. The mechanical isolation of the vision system 810 with respect to the enclosure 702 allows the components of the vision system 810 to move freely, in accordance with any movement of the bracket assembly 840, without obstruction from the enclosure 702 or any affixation or engagement between the vision system 810 and the enclosure 702. Although an external force or load force exerted on the electronic device 700 may cause movement of the bracket assembly 840 relative to the enclosure 702, the bracket assembly 840 can maintain a constant separation between the first camera module 812, the light emitting module 814, and the second camera module 816. This ensures the components of the vision system 810 remain at a fixed and predetermined distance from each other, and may not require a re-calibration setting. Accordingly, any movement of the bracket assembly 840 may correspond to an equal amount of movement of the first camera module 812, the light emitting module 814, and the second camera module 816 such that there is no relative movement between the modules. Furthermore, due in part to the mechanical isolation of the vision system 810, a force to the enclosure 702 that causes the enclosure 702 to bend, warp, or otherwise become altered may result in the further compression of the first spring element 846 and/or the second spring element 848 without i) affecting the fixed distance between the components of the vision system 810, and ii) causing mechanical contact between components of the vision system 810 and the enclosure 702.

Also, the openings of the masking layer 728, and in turn, the material in the openings, may be separated from the through hole 714 by equal distances, and accordingly, some of the openings are symmetrically positioned around the through hole 714. For example, a center point of the first opening 732 is positioned a first distance 902 from a center point of the through hole 714, and a center point of the fourth opening 738 is positioned a second distance 904 from the center point of the through hole 714. The first distance 902 may be the same, or at least substantially similar to, the second distance 904. Also, a center point of the second opening 734 is positioned a third distance 906 from the center point of the through hole 714, and a center point of the third opening 736 is positioned a fourth distance 908 from the center point of the through hole 714. The third distance 906 may be the same, or at least substantially similar to, the fourth distance 908. These symmetric relationships may enhance the overall appearance of the electronic device 700. Also, when the assembly operation is complete, the heat dissipation structure 838 and the heat sinking element 876 are coupled to the first bracket part 852 and the metal layer 860, respectively. This places the lighting element 836 and the light emitting module 814 in thermal contact with the first bracket part 852 and the metal layer 860.

Figure 24:
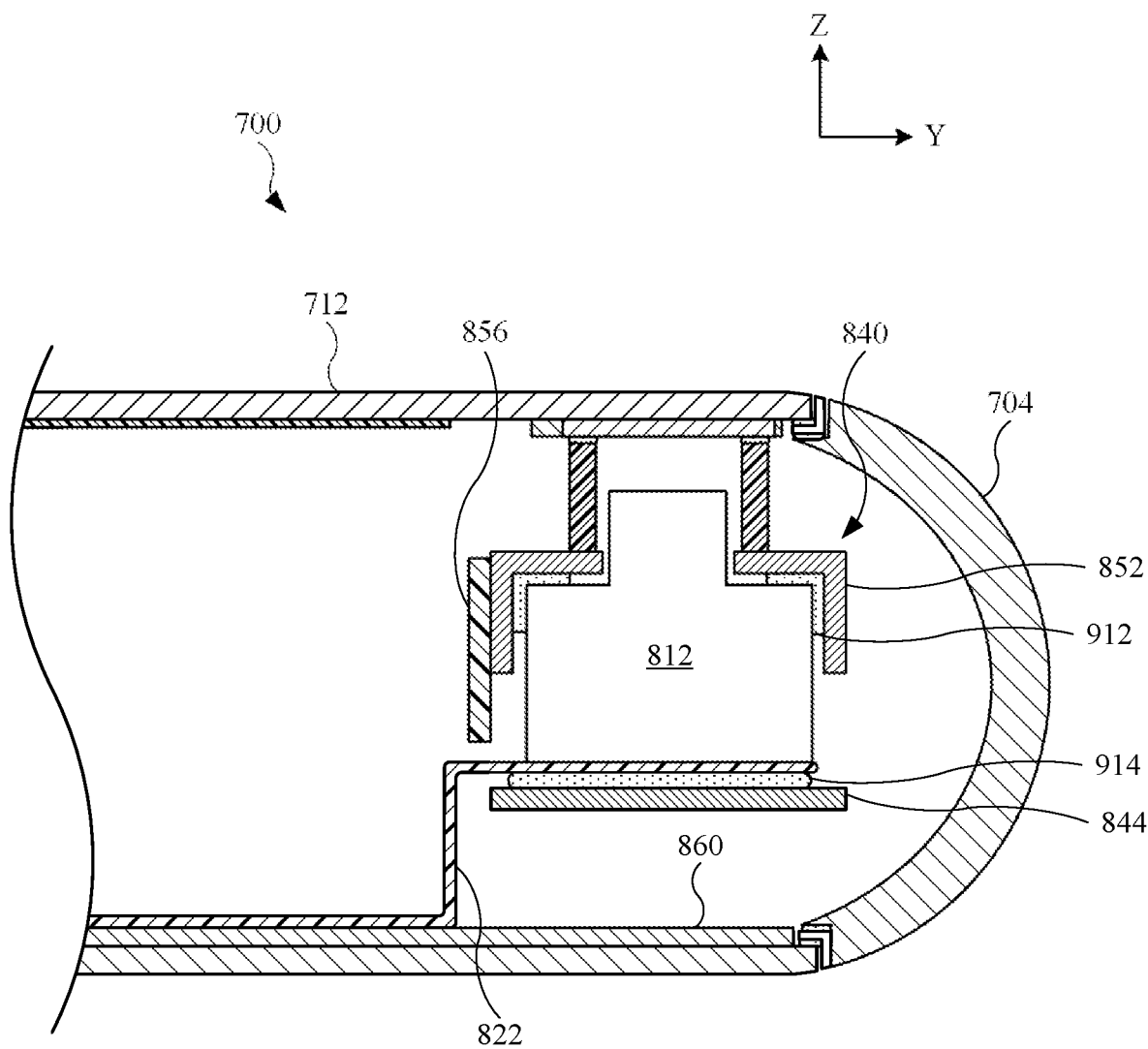
FIG. 24 illustrates an alternate cross sectional view of the electronic device shown in FIGS. 21-23, showing the positioning of some of the components within the electronic device, in accordance with some described embodiments.

FIG. 24 illustrates an alternate cross sectional view of the electronic device 700 shown in FIGS. 21-23, showing the positioning of some of the components within the electronic device 700, in accordance with some described embodiments. As shown, the first bracket part 852 (associated with the first bracket 842 in FIG. 21) and the second bracket 844 may extend beyond the transparent cover 712, in the Y-dimension, and may be at least partially covered by the first sidewall component 704 (also shown in FIG. 13). In some instances, the first sidewall component 704 provides not only a protective structure but also forms part of an antenna assembly designed as a transceiver to send and receive radio frequency ("RF") communication in the form of RF energy. Further, an antenna component (not shown in FIG. 24) of the antenna assembly may be proximate to the first bracket part 852 and/or the second bracket 844. In this regard, due in part to the first bracket part 852 and/or the second bracket 844 being formed from metal, the bracket assembly 840 may electrically couple to and potentially affect the performance of the antenna assembly. However, the bracket assembly 840 can be grounded to the metal layer 860 in a manner previously described (see FIG. 21), and accordingly, may provide a reference ground for the antenna component. As a result, the bracket assembly 840 may complement the use of the antenna assembly so as not to impede the antenna assembly.

The first camera module 812 may be secured with the first bracket part 852 by an adhesive layer 912. In some instances, the adhesive layer 912 may include an electrically conductive adhesive, thereby electrically coupling the first camera module 812 with the first bracket part 852. Accordingly, due to the bracket assembly 840 being electrically coupled to the metal layer 860, the first camera module 812 may be electrically coupled to the metal layer 860 such that the first camera module 812 can be electrically grounded. Also, the first camera module 812 may be electrically and mechanically coupled to the first flexible circuit 822 that is further electrically and mechanically coupled to the circuit board 820 (shown in FIG. 17). The first flexible circuit 822 may be secured with the second bracket 844 by an adhesive layer 914. Also, the first flexible circuit 822 may pass through an opening between the second bracket 844 and a third bracket part 856. The third bracket part 856 may include any features previously described for the third bracket part 256 (shown in FIG. 4). Accordingly, the third bracket part 856 may act as a support member or supporting element that extends substantially across a dimension (such as a length) of the first bracket part 852.

Figure 25:
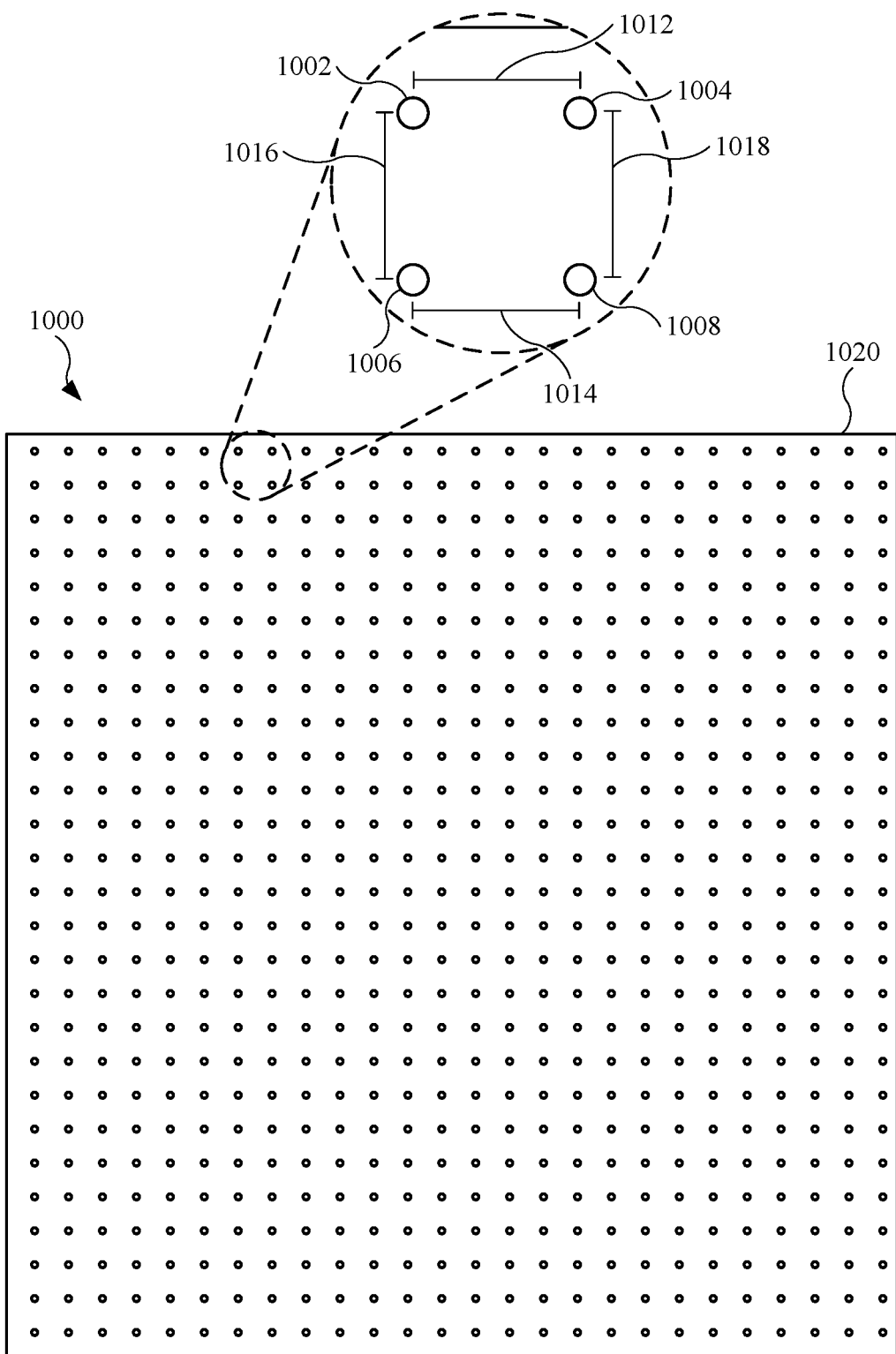
FIG. 25 illustrates a plan view of a dot pattern generated by a light source, in accordance with some described embodiments.

FIG. 25 illustrates a plan view of a dot pattern 1000 generated by a light source, in accordance with some described embodiments. The dot pattern 1000 may include a light pattern having several dots projected onto a flat object 1020. The dot pattern 1000 may be generated from light produced by a light emitting module, such as the light emitting module 114 (shown in FIG. 1). In this regard, the dot pattern 1000 may include IR light that is not visible by the human eye. Also, the dots of the dot pattern 1000 may be spaced equidistantly apart in rows and columns, when projected onto the flat object 1020. In other words, the pitch between adjacent dots is equal when the dot pattern 1000 is projected onto the flat object 1020. For example, as shown in the enlarged view, the dot pattern 1000 may include a first dot 1002 and a second dot 1004 adjacent to the first dot 1002. The first dot 1002 is separated from the second dot 1004 by a first distance 1012. The dot pattern 1000 may include a third dot 1006 and a fourth dot 1008 adjacent to the third dot 1006. The third dot 1006 is separated from the fourth dot 1008 by a first distance 1014 that is the same as, or substantially similar to, the first distance 1012. Also, the first dot 1002 is adjacent to the third dot 1006 and separated from the third dot 1006 by a third distance 1016 that is the same as, or substantially similar to, the first distance 1012. The second dot 1004 is adjacent to the fourth dot 1008 and separated from the fourth dot 1008 by a fourth distance 1018 that is the same as, or substantially similar to, the first distance 1012.

The flat object 1020, having no change or variance in depth, allows for the equidistant spacing of the dots of the dot pattern 1000 (described above). In this regard, an electronic device (not shown) that includes a vision system having a light emitting module previously described may use the equidistant spacing of the dots to determine the flat object 1020 is flat. However, when the object is not flat, the dots of the dot pattern 1000 may no longer be spaced equidistantly apart.

Figure 26:
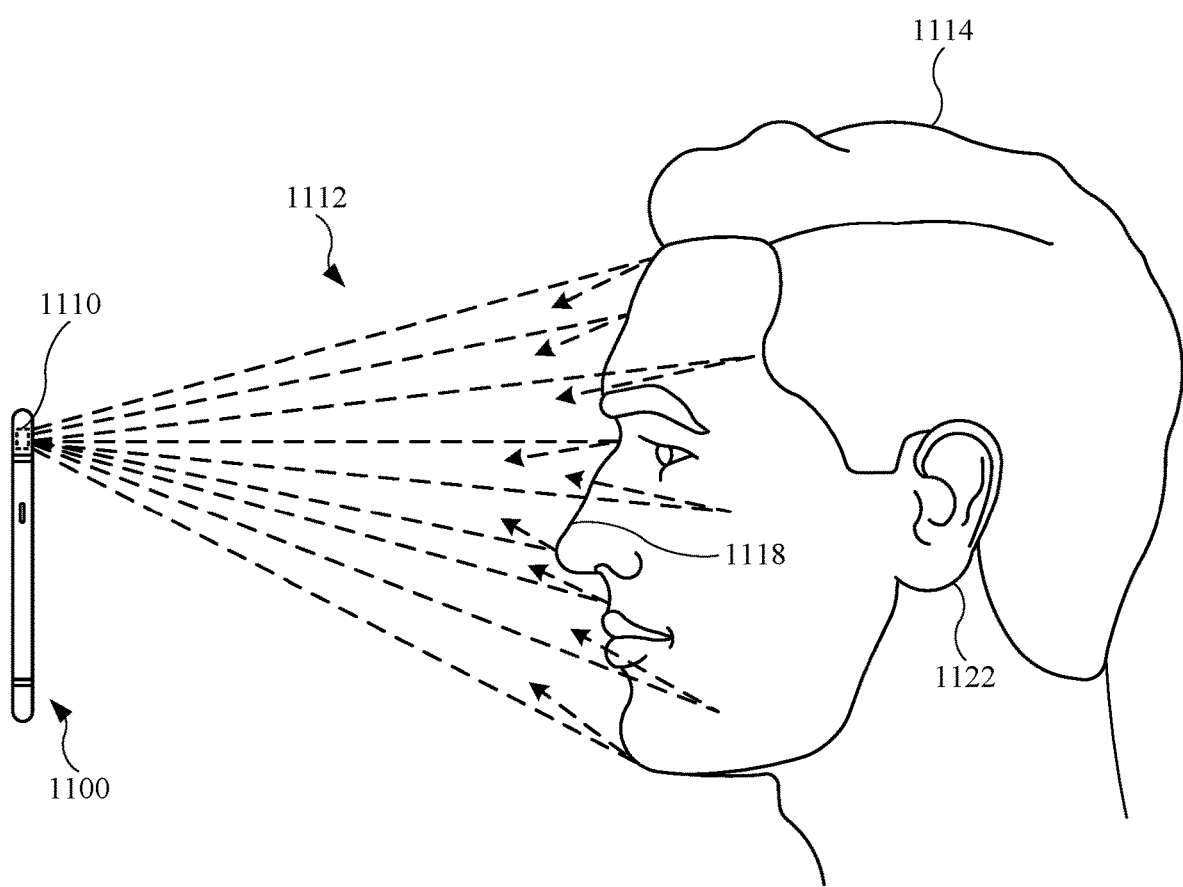
FIG. 26 illustrates a side view of an electronic device using a vision system to determine dimensional information of a user, in accordance with some described embodiments.
Figure 27:
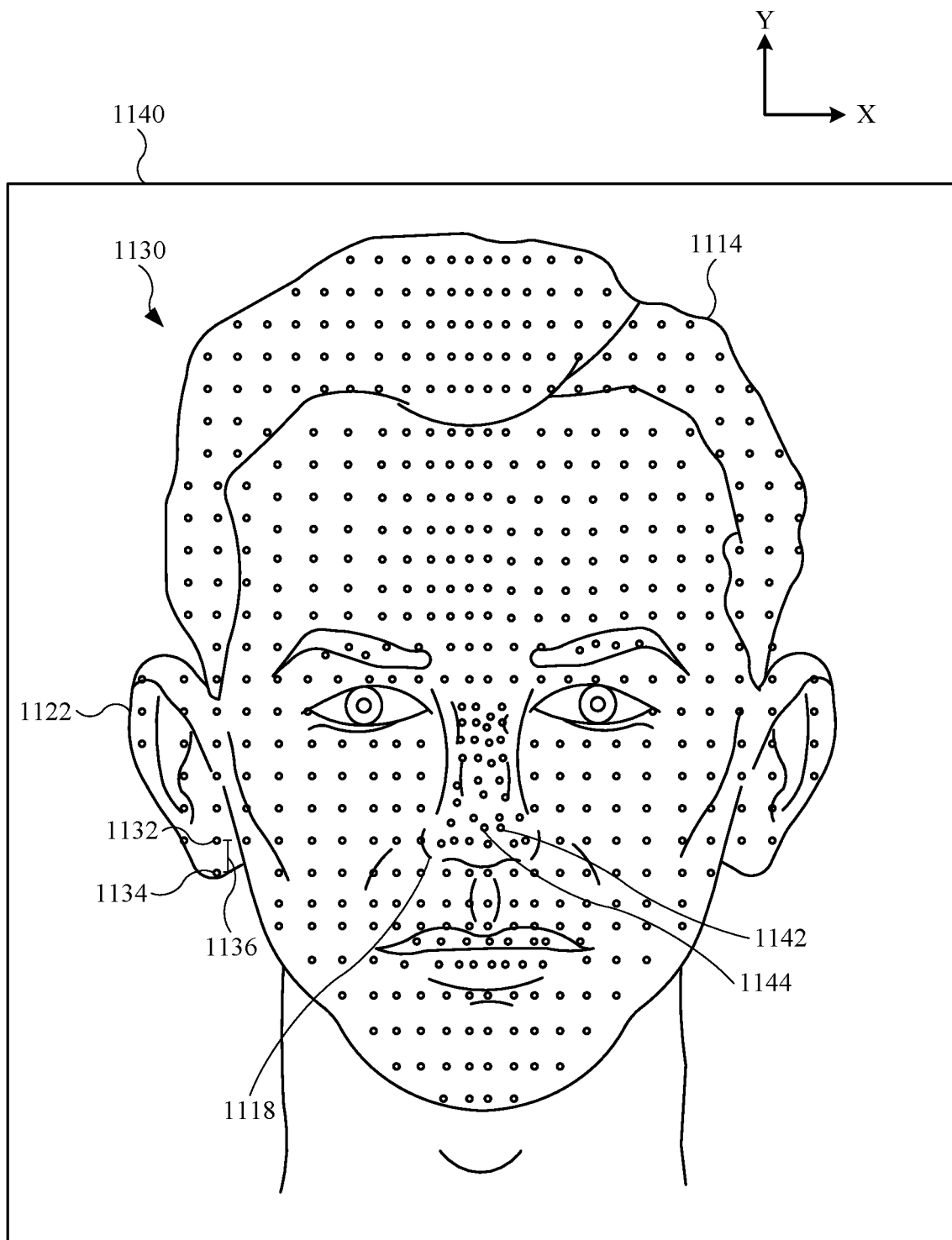
FIG. 27 illustrates a plan view of a dot pattern projected onto the user, showing various spatial relationships of dots of the dot pattern with respect to each other.

FIGS. 26 and 27 illustrate an electronic device that includes a vision system having features for a vision system described herein. This vision system can be used to provide object recognition, including facial recognition, of a three-dimensional object using information provided by a dot pattern having several sets of adjacent dots that are spaced apart at different distances as compared to other sets of adjacent dots.

FIG. 26 illustrates a side view of an electronic device 1100 using a vision system 1110 to determine dimensional information of a user 1114, in accordance with some described embodiments. The electronic device 1100 and the vision system 1110 may include any features described herein for an electronic device and a vision system, respectively. Accordingly, the vision system 1110 may include a light emitting module (not shown) designed to emit light rays 1112 in accordance with a dot pattern, such as the dot pattern 1000 (shown in FIG. 25). However, when the light rays 1112 are directed to an object having features with different depths (corresponding to different distances from the electronic device 1100), some of the light rays 1112 will reach the user 1114 before others. As a result, the light rays 1112 may project a dot pattern onto the user 1114 in which the dots are not spaced equidistantly apart. This will be shown and described below. As commonly known, a face of the user 1114 may include various features—eyes, ears, nose, lips, etc.—that can define different depths of the user 1114, and accordingly, different distances from the electronic device 1100. For example, two adjacent light rays may project adjacent dots onto a nose 1118 of the user 1114 that are closer together than two adjacent light rays that project adjacent dots onto an ear 1122 of the user 1114. The arrangement of the dots can form a dot pattern that represents a unique profile stored on the electronic device 1100, and subsequently used by the electronic device 1100 to recognize the user 1114 in order to provide a user authentication, as a non-limiting example. Also, the light rays 1112 shown in FIG. 26 may represent a fraction of the total light rays. In other words, a light emitting module described herein may emit more lights rays than what is shown in FIG. 26.

FIG. 27 illustrates a plan view of a dot pattern 1130 projected onto an image 1140 of the user 1114, showing various spatial relationships of dots of the dot pattern 1130 with respect to each other. It should be noted that the dot pattern 1130 projected onto the user 1114 is the result of the light rays 1112 emitted from the electronic device 1100 (shown in FIG. 26). The image 1140 shown in FIG. 27 may be an image captured and produced by a first camera module described herein of the vision system 1110 of the electronic device 1100 (shown in FIG. 26). As shown, the image 1140 may include a two-dimensional profile (in the X-Y plane) of the user 1114 with the dot pattern 1130 projected onto the image 1140 of the user 1114. Based on the dot pattern 1130, the two-dimensional profile of the user 1114 can be used by the electronic device 1100 to create a depth map.

Due in part to the user 1114 having various facial features that represent different depths, or distances from the electronic device 1100 (shown in FIG. 26), the dot pattern 1130 may include adjacent dots that are spaced apart in manner different than other dots. In other words, the pitch between adjacent dots varies when the dot pattern 1130 is projected onto the user 1114 (or another other object that includes three-dimensional features). For example, the dot pattern 1130 may include a first dot 1132 and a second dot 1134 adjacent to the first dot 1132, with the first dot 1132 and the second dot 1134 projected onto the ear 1122 and separated by a distance 1136. The dot pattern 1130 may further include a third dot 1142 and a fourth dot 1144 adjacent to the third dot 1142, with the third dot 1142 and the fourth dot 1144 projected onto the nose 1118 and separated by a distance (not labeled) that is less than the distance 1136 between the first dot 1132 and the second dot 1134. As a result, the electronic device 1100 (shown in FIG. 26) can compare spacing between adjacent dots projected onto one feature, such as the nose 1118, as well as adjacent dots projected onto another feature, such as the ear 1122, use the comparison to determine one feature is closer than another feature. Also, the location of the adjacent dots, and their associated spacing, can be stored by the electronic device 1100 (using memory), which can further be used to determine the user 1114.

The electronic device 1100 (shown in FIG. 26) can retrieve and process the spacing or distance between all adjacent dots in the dot pattern 1130, and determine several additional features of the user 1114. The image 1140, in conjunction with the spacing information of adjacent dots of the dot pattern 1130 projected onto the image 1140, can be used to build a unique profile of the user 1114. The electronic device 1100 (shown in FIG. 26) may compare the profile against a known or preset (reference) profile of the user 1114, and determine whether the user 1114 is carrying the electronic device 1100. If a sufficient match between the captured profile of the user 1114 and the reference profile of the user 1114 is determined, the electronic device 1100 may use the match as a virtual password and the unlock the electronic device 1100, which may include switching on a display assembly (such as the display assembly 716 shown in FIG. 13) from a locked screen to an unlocked screen thereby granting the user 1114 access to the various features and contents of the electronic device 1100. While the object shown and described in FIGS. 26 and 27 shows a face of the user 1114, the electronic device 1100 may provide object recognition of other three-dimensional objects other than the user 1114 of the electronic device 1100, such as inorganic objects.

Figure 28:
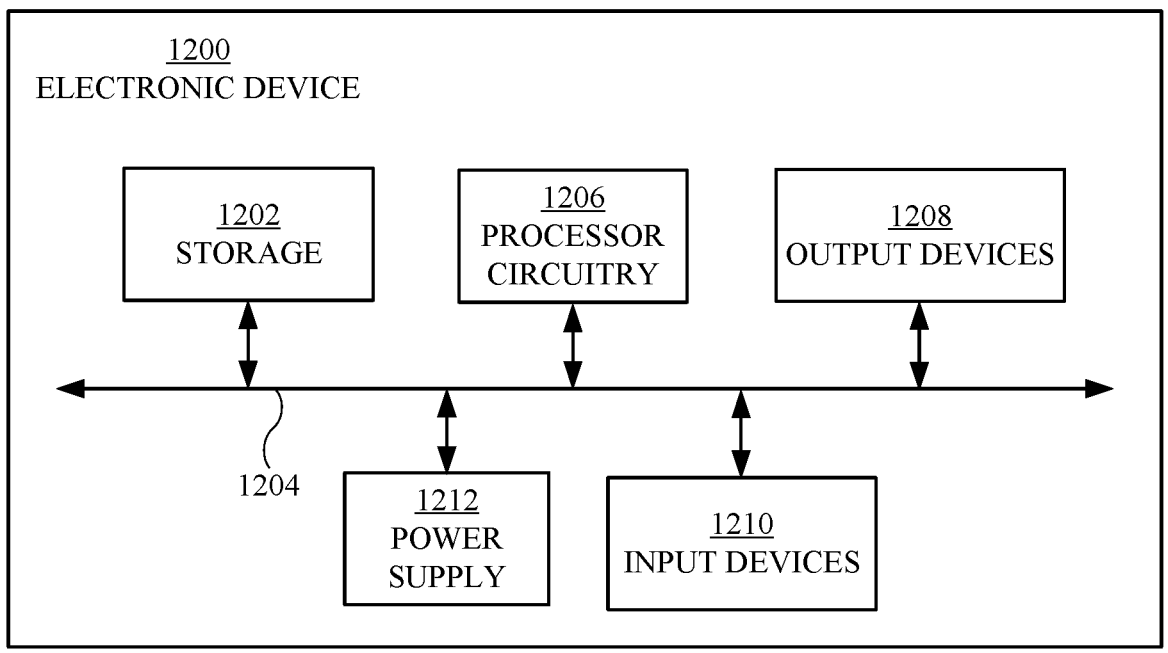
FIG. 28 illustrates a schematic diagram of an electronic device, in accordance with some described embodiments.

FIG. 28 illustrates a schematic diagram of an electronic device 1200. The electronic device 1200 may be representative of other embodiments of electronic devices described herein. The electronic device 1200 may include storage 1202. The storage 1202 may include one or more different types of storage such as hard disk drive storage, nonvolatile memory (such as flash memory or other electrically-programmable read-only memory), volatile memory (such as battery-based static or dynamic random-access memory).

The electronic device 1200 may include processor circuitry 1206 having one or more processors that communicate with several peripheral devices via a bus system 1204. The processor circuitry 1206 may be used to control the operation of the electronic device 1200, and may include a processor (such as a microprocessor) and other suitable integrated circuits. In some embodiments, the processor circuitry 1206 and the storage 1202 run software on the electronic device 1200. For example, the software may include object recognition software. In this regard, the electronic device 1200 may include output devices 1208 and input devices 1210 that supply data to the electronic device 1200, and also allow data to be provided from the electronic device 1200 to external devices. The output devices 1208 may include a light emitting module of a vision system designed to project a light pattern (such as a dot pattern) onto an object, and is used in conjunction with the object recognition software. The output devices 1208 may further include a lighting element used during low-light (dim) applications. Additionally, the output devices 1208 may include a display layer (associated with a display assembly) and an audio module.

The input devices 1210 may include multiple camera modules. For instances, one of the camera modules can be used to capture an image and is used in conjunction with the object recognition software. Another camera module can be used to receive the light pattern from the light emitting module. Using the object recognition software, the light pattern can be superimposed onto the captured image and the electronic device 1200 can determine what the object is. For example, the object recognition software can be used for facial recognition. The object recognition software can use the camera modules and light emitting module to provide an initial scan of the object, and can store the initial scan as a profile on the storage 1202. The initial scan may be referred to as a reference image or reference scan. Then, the object recognition software can be used to scan a subsequent object and create a profile of the subsequent object to determine whether the subsequent object matches the initially stored profile on the storage 1202. The "match" between the reference image and a subsequent image may be based upon a software or algorithm on the storage 1202 that requires a comparison (between the reference image and the subsequent image) to meet or exceed a threshold match. For example, if a comparison between the reference image and a subsequently captured image is 75 percent or greater, a "match" is determined. The percent match setting can be adjusted (higher or lower) if necessary. The processor circuitry 1206 can determine whether the match is made. The processor circuitry 1206 may signal the electronic device 1200 to unlock, thereby allowing a user to interact with the electronic device 1200. Otherwise, if a comparison between the reference image and the subsequent image does not meet or exceed threshold match (as determined by the processor circuitry 1206), the processor circuitry 1206 may signal the display of the electronic device to display a fail message, or signal to the user that permission to use the electronic device is not granted. Additionally, the input devices 1210 may include buttons, switches, touch input and force touch layers (associated with a display assembly). Also, the electronic device 1200 may include a power supply (such as a battery) that provides electrical energy to the storage 1202, the processor circuitry 1206, the output devices 1208, and the input devices 1210.

Figure 30:
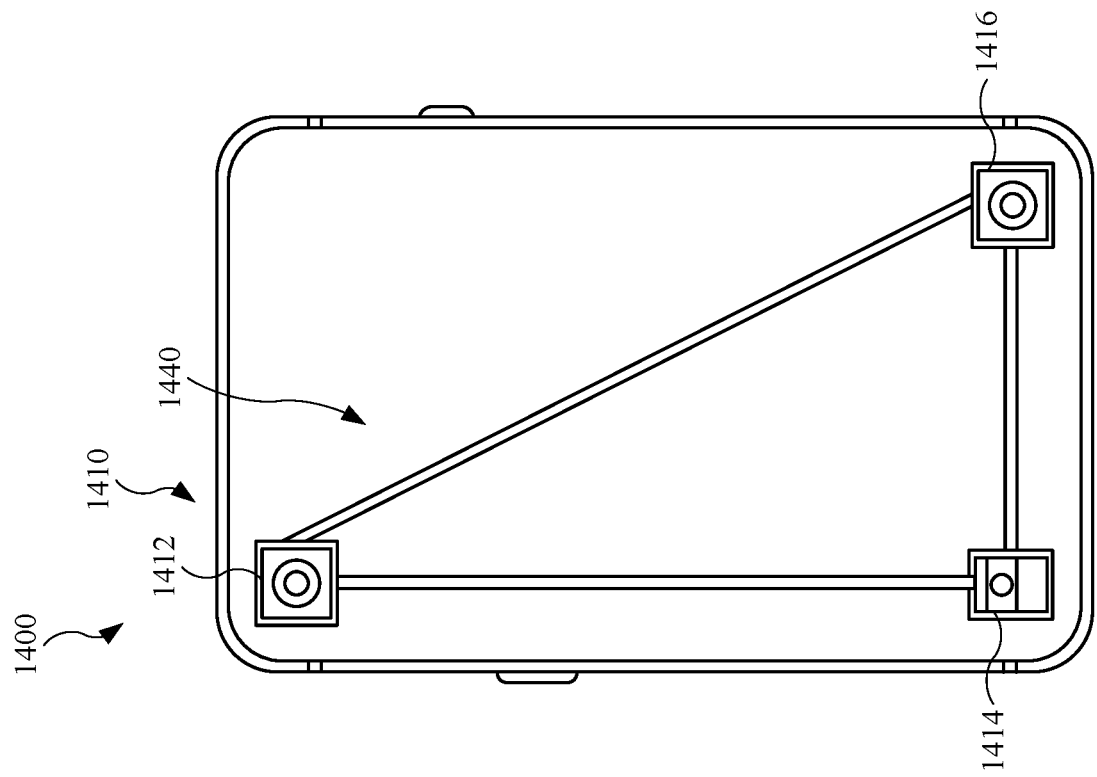
FIG. 30 illustrates a plan view of an alternate embodiment of an electronic device that includes a vision system held by a bracket assembly, in accordance with some described embodiments.
Figure 29:
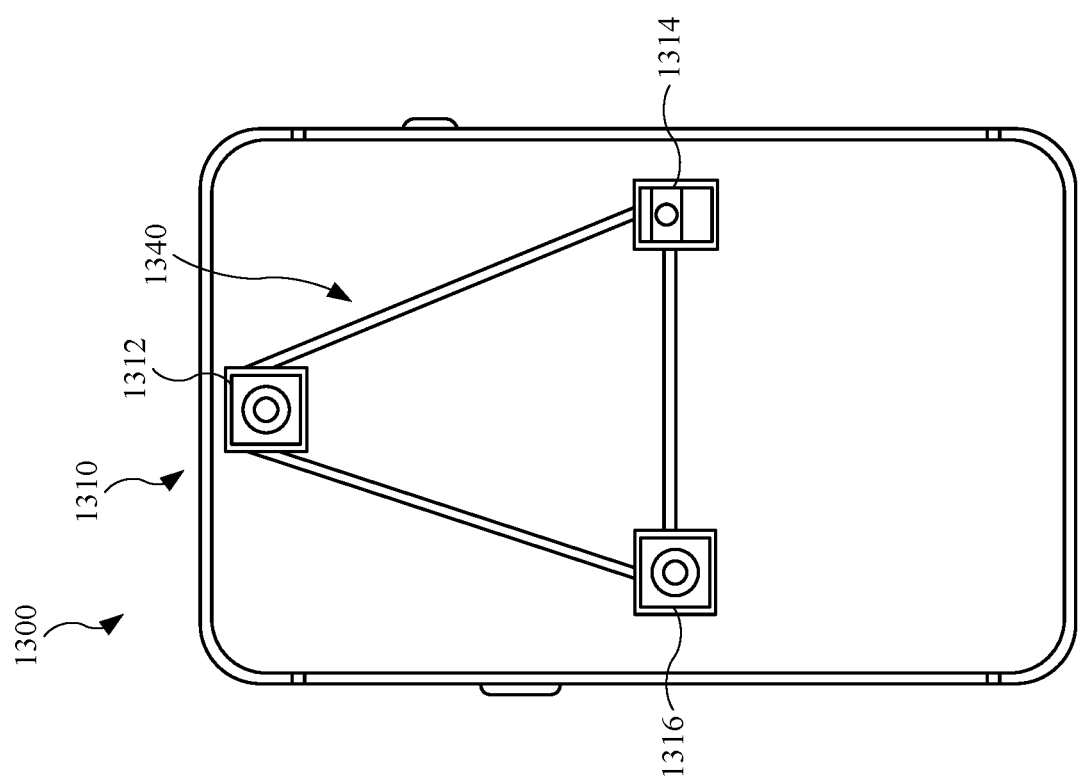
FIG. 29 illustrates a plan view of an alternate embodiment of an electronic device that includes a vision system held by a bracket assembly, in accordance with some described embodiments.

While some vision systems described herein are generally located at or near an uppermost portion of an electronic device, FIGS. 29 and 30 show electronic devices that include a vision system with modules positioned at different locations throughout an electronic device. Although not shown, the electronic devices in FIGS. 29 and 30 may include any features described herein for an electronic device, a vision system, and a bracket assembly.

FIG. 29 illustrates a plan view of an alternate embodiment of an electronic device 1300 that includes a vision system 1310 held by a bracket assembly 1340, in accordance with some described embodiments. The vision system 1310 is designed to provide recognition of an object, which may include facial recognition of a user of the electronic device 1300. The vision system 1310 may include a first camera module 1312 designed to capture an image of the object. The vision system 1310 may further include a light emitting module 1314 is designed to generate light rays that are projected onto the object into the form of light rays. The vision system 1310 may further include a second camera module 1316 is designed to receive the dot pattern that is projected onto the object. As shown, the bracket assembly 1340 may space the modules of the vision system according to a triangular arrangement. However, other possible arrangements are possible. The bracket assembly 1340 may maintain separation, by a predetermined distance, between the first camera module 1312 and the light emitting module 1314, the light emitting module 1314 and the second camera module 1316, and the first camera module 1312 and the second camera module 1316. A transparent cover and display assembly (both not shown in FIG. 29) of the electronic device 1300 may be modified in order to allow the first camera module 1312, the light emitting module 1314, and the second camera module 1316 to function in a manner that provides the object recognition. This may include removal or realignment of the display assembly, as an example.

FIG. 30 illustrates a plan view of an alternate embodiment of an electronic device 1400 that includes a vision system 1410 held by a bracket assembly 1440, in accordance with some described embodiments. The vision system 1410 is designed to provide recognition of an object, which may include facial recognition of a user of the electronic device 1400. The vision system 1410 may include a first camera module 1412 designed to capture an image of the object. The vision system 1410 may further include a light emitting module 1414 is designed to generate light rays that are projected onto the object into the form of light rays. The vision system 1410 may further include a second camera module 1416 is designed to receive the dot pattern that is projected onto the object. As shown, the bracket assembly 1440 may space the modules of the vision system according to a triangular arrangement. However, other possible arrangements are possible. The bracket assembly 1440 may maintain separation, by a predetermined distance, between the first camera module 1412 and the light emitting module 1414, the light emitting module 1414 and the second camera module 1416, and the first camera module 1412 and the second camera module 1416. Further, as shown, the bracket assembly 1440 may position the aforementioned modules in corners of the electronic device 1400. A transparent cover and display assembly (both not shown in FIG. 30) of the electronic device 1400 may be modified in order to allow the first camera module 1412, the light emitting module 1414, and the second camera module 1416 to function in a manner that provides the object recognition. This may include removal or realignment of the display assembly, as an example. However, due in part to the modules being positioned in the corners, the amount of removal or realignment of the display assembly may be limited.

Figure 31:
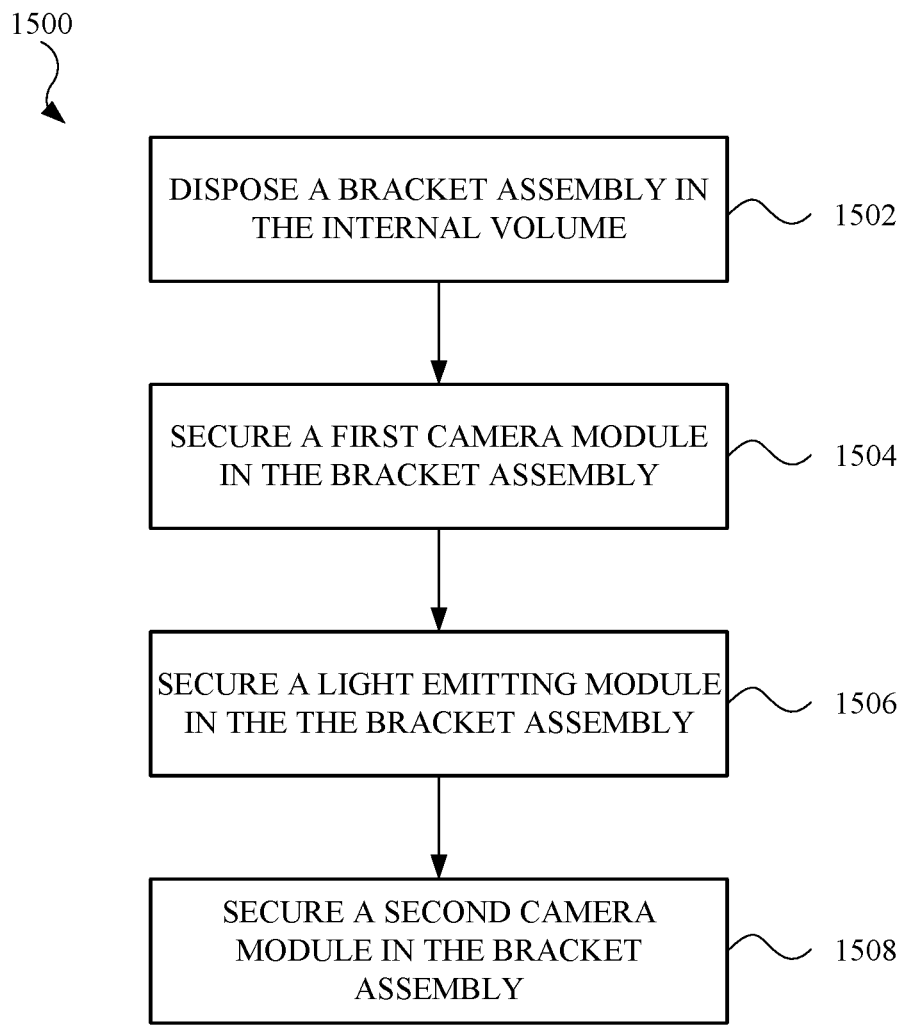
FIG. 31 illustrates a flowchart describing a method for assembling a vision system for recognition of an object, in accordance with some described embodiments.

FIG. 31 illustrates a flowchart 1500 describing a method for assembling a vision system for recognition of an object, in accordance with some described embodiments. The flowchart 1500 may describe a vision system used for facial recognition. In step 1502, a first camera module carried with a bracket assembly. The first camera module is configured to capture an image of an object. Also, the bracket assembly may include multiple brackets pieces, such as a first bracket and a second bracket.

In step 1504, a first camera module is secured with the bracket assembly. The first camera module is configured to capture an image of the object. The first camera module may capture visible light reflected from the object.

In step 1506, a light emitting module is secured with the bracket assembly. The light emitting module is configured to emit light that projects a dot pattern onto the object. The light emitting module may emit IR light. Further, the light emitting module may emit lights rays in accordance with a dot pattern of light.

In step 1508, a second camera module is secured with the bracket assembly. The second camera module can be carried by the bracket assembly. Also, the second camera module is configured to capture the dot pattern projected onto the object. For example, the second camera module may capture a reflected portion of the dot pattern projected onto the object. In this manner, a processor that receives the image and the reflected portion of the dot pattern can provide recognition of the object. The second camera may include a filter designed to receive only light generated by the light emitting module, or at least light in the frequency range of light generated by the light emitting module. Further, the dot pattern, which can be formed by light rays, may include several adjacent dots that are separated by distances that are different than distances of other adjacent dots. The object can be determined by the image, in conjunction with the light rays received by the second camera module. Further, the bracket assembly may provide structural rigidity such that any movement of the bracket assembly corresponds to the same amount of movement of the modules, so as to prevent relative movement of the modules.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
    an enclosure that defines an internal volume, the enclosure comprising sidewall components;
    an un-affixed bracket assembly positioned in the internal volume free of affixation to the enclosure;
    a camera module carried by the bracket assembly;
    a transparent cover secured with the sidewall components and covering the bracket assembly, the transparent cover including a masking layer, the masking layer having a masking layer opening; and
    an alignment module secured to the transparent cover, wherein the alignment module aligns the camera module with the masking layer opening.

2. The electronic device of claim 1, wherein the camera module is a first camera module that is configured to capture an image of an object, and wherein the electronic device further comprises:
    a processor;
    a light emitting module electrically coupled to the processor and carried by the bracket assembly, the light emitting module configured to emit light rays toward the object; and
    a second camera module electrically coupled to the processor and carried by the bracket assembly, the second camera module configured to receive the light rays reflected off the object, wherein the light rays received by the second camera module form a dot pattern used by the processor to create a multi-dimensional image of the object.

3. The electronic device of claim 2, wherein the bracket assembly maintains a first predetermined distance between the first camera module and the second camera module, and wherein the bracket assembly maintains a second predetermined distance between the light emitting module and the second camera module.

4. The electronic device of claim 2, further comprising a lighting element that provides additional light to the object, wherein the alignment module comprises:

a body; and a first rail and a second rail molded to the body, wherein the lighting element is positioned between the first rail and the second rail.

5. The electronic device of claim 4, wherein the body comprises:

a first section that receives the camera module by a first opening, the first section having a first extended portion that includes a contoured region that reduces the first opening; and a second section that receives the second camera module by a second opening, the second section having a second extended portion that defines a semicircular shape.

6. The electronic device of claim 1, further comprising a biasing element that extends from the bracket assembly and engages the enclosure, the biasing element providing a force that biases the bracket assembly against the alignment module.

7. The electronic device of claim 1, further comprising a material that covers the opening, wherein the masking layer comprises an opaque layer, and wherein the material permits passage of visible light.

8. The electronic device of claim 1, further comprising:

an audio module;

a microphone;

a lighting element; and an ambient light sensor, wherein the alignment module aligns the audio module, the microphone, the lighting element, and the ambient light sensor in the internal volume.

9. An electronic device, comprising:

an enclosure that includes a wall and sidewall components that combine with the wall to define an internal volume;

a transparent cover secured with the enclosure, the transparent cover having an alignment module; and an un-affixed bracket assembly positioned in the internal volume, the un-affixed bracket assembly free of affixation to the enclosure and carrying a vision system aligned in the internal volume by the alignment module and configured for object recognition of an object that is external to the enclosure, wherein compression forces provided by the transparent cover and the enclosure to the bracket assembly maintain the bracket assembly fixed in the internal volume.

10. The electronic device of claim 9, wherein the bracket assembly comprises:

a first bracket positioned against the alignment module; and a second bracket, wherein the vision system is positioned at least partially between the first bracket and the second bracket.

11. The electronic device of claim 10, further comprising a module carrier coupled to the first bracket, wherein the vision system comprises a light emitting module carried by the module carrier.

12. The electronic device of claim 11, wherein the vision system further comprises:

a camera module that captures an image of the object; and a second camera module that receives light generated by the light emitting module and reflected off the object, the light forming a dot pattern on the object used by the vision system for the object recognition.

13. The electronic device of claim 12, further comprising: a display assembly secured with the transparent cover, the display assembly comprising a notch; and a masking layer secured to the transparent cover at a location corresponding to the notch, the masking layer having a first opening, a second opening, and a third opening, wherein the light emitting module is aligned with the first opening, the camera module is aligned with the second opening, and the second camera module is aligned with the third opening.

14. The electronic device of claim 13, further comprising:

a first material positioned in the first opening;

a second material positioned in the second opening; and a third material positioned in the third opening, wherein the first material and the third material allow passage of infrared light, and wherein the second material allows passage of visible light.

15. The electronic device of claim 9, further comprising a circuit board positioned in the internal volume, wherein the vision system comprises a camera module having a flexible circuit that provides an electrical and a mechanical connection to the circuit board, wherein except for the mechanical connection, the bracket assembly is not affixed to the enclosure.

16. A method for assembling an electronic device that includes an enclosure that includes a wall and sidewall components that combine with the wall to define an internal volume, the method comprising:

providing an un-affixed bracket assembly in the internal volume, the un-affixed bracket assembly free of affixation to the enclosure and carrying a camera module; and securing a transparent cover with the sidewall components of the enclosure, the transparent cover having an alignment module, the transparent cover further having a masking layer that includes an opening, wherein securing the transparent cover with the enclosure aligns the camera module such that the camera module is aligned with the opening;

wherein compression forces provided by the transparent cover and the enclosure to the bracket assembly maintain the bracket assembly fixed in the internal volume.

17. The method of claim 16, wherein providing the bracket assembly comprises:

providing a first bracket;

providing a second bracket that is welded to the first bracket; and providing a module carrier that is welded to the first bracket.

18. The method of claim 17, further comprising:

installing a processor;

installing a light emitting module that is electrically coupled to the processor and carried by the module carrier, the light emitting module configured to emit light rays toward an object; and installing a second camera module that is electrically coupled to the processor and carried by the bracket assembly, the second camera module configured to receive the light rays reflected off the object, wherein the light rays received by the second camera module form a dot pattern used by the processor to create a multi-dimensional image of the object.

19. The method of claim 18, wherein the bracket assembly maintains a first predetermined distance between the camera module and the second camera module, and wherein the bracket assembly maintains a second predetermined distance between the light emitting module and the second camera module.

20. The method of claim 16, further comprising securing, with the alignment module, an audio module, a microphone, a light emitting module, and an ambient light sensor.

\* \* \* \* \*